United States Patent
Nakazawa

(10) Patent No.: US 12,063,526 B2
(45) Date of Patent: Aug. 13, 2024

(54) SYSTEM, INFORMATION-PROVIDING DEVICE, PROGRAM, AND INFORMATION-PROVIDING METHOD

(71) Applicant: SOFTBANK CORP., Tokyo (JP)

(72) Inventor: Eiji Nakazawa, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/349,975

(22) Filed: Jul. 11, 2023

(65) Prior Publication Data
US 2023/0362672 A1 Nov. 9, 2023

Related U.S. Application Data

(63) Continuation of application No. PCT/JP2021/048700, filed on Dec. 27, 2021.

(30) Foreign Application Priority Data

Feb. 4, 2021 (JP) .................. 2021-016285

(51) Int. Cl.
*H04W 16/28* (2009.01)
*H01Q 1/28* (2006.01)
*H04W 84/06* (2009.01)

(52) U.S. Cl.
CPC .............. *H04W 16/28* (2013.01); *H01Q 1/28* (2013.01); *H04W 84/06* (2013.01)

(58) Field of Classification Search
CPC ...... B64C 39/02; B64D 45/00; H01Q 1/1257; H01Q 1/28; H01Q 15/14; H01Q 3/01;
(Continued)

(56) References Cited

U.S. PATENT DOCUMENTS

2018/0072428 A1* 3/2018 Adachi ................ H04N 9/3194
2020/0043348 A1* 2/2020 Ghosh .................. G08G 5/0013
(Continued)

FOREIGN PATENT DOCUMENTS

JP 2000078069 A 3/2000
JP 2003069465 A 3/2003
(Continued)

OTHER PUBLICATIONS

International Search Report and (ISA/237) Written Opinion of the International Search Authority for International Patent Application No. PCT/JP2021/048700, mailed by the Japan Patent Office on Mar. 22, 2022.

*Primary Examiner* — Tan H Trinh

(57) ABSTRACT

Provided is a system, comprising: an information-providing device; and a flying object functioning as a stratosphere platform and equipped with a control device radiating a beam to form a wireless communication area to provide wireless communication service to a user terminal in the wireless communication area, wherein the information-providing device irradiates the flying object with a radio wave including a response signal to the beam when a frequency of the beam is a predetermined frequency band, and the control device comprises: a radio wave receiving unit receiving the radio wave; a non-target area judging unit judging whether a non-target area of the wireless communication service exists in the wireless communication area based on the response signal; and a flying object controlling unit controlling the flying object not to irradiate the non-target area with the beam in response to the non-target area judging unit judging that the non-target area exists.

19 Claims, 18 Drawing Sheets

(58) Field of Classification Search
CPC .... H04B 7/18504; H04W 16/28; H04W 4/02;
H04W 84/06
USPC ...................................................... 455/11.1
See application file for complete search history.

(56) References Cited

U.S. PATENT DOCUMENTS

| | | | |
|---|---|---|---|
| 2021/0153136 A1* | 5/2021 | Chen ................ | H04W 72/1268 |
| 2021/0183341 A1* | 6/2021 | Shi .................... | G02B 27/0093 |
| 2021/0226691 A1 | 7/2021 | Shimazaki | |
| 2021/0253243 A1* | 8/2021 | Tsutsui ............... | H04B 7/18504 |
| 2022/0139237 A1* | 5/2022 | Niihata ............... | G08G 5/0078 |
| | | | 455/450 |
| 2023/0012473 A1* | 1/2023 | Nakamura .......... | H01M 50/249 |
| 2023/0367334 A1* | 11/2023 | Suzuki ................ | B64U 10/13 |

FOREIGN PATENT DOCUMENTS

| | | |
|---|---|---|
| JP | 2018177135 A | 11/2018 |
| JP | 2019213079 A | 12/2019 |
| JP | 2020048169 A | 3/2020 |
| WO | 2020236041 A1 | 11/2020 |

\* cited by examiner

| TYPE | FREQUENCY BAND | POWER CONSUMPTION | LICENSE | INTERFERENCE | CIRCUIT DESIGN | MAINTENANCE | DEVICE SCALE |
|---|---|---|---|---|---|---|---|
| SIMPLE TYPE | LPWA | MINIMUM | UNNECESSARY | LARGE | LOW | LOW | MEDIUM |
| STANDARD TYPE | SL | SMALL TO MEDIUM | NECESSARY | SMALL | LOW | LOW | SMALL |
| HYBRID TYPE | LPWA/SL | LARGE | UNNECESSARY/ NECESSARY | LARGE/ SMALL | HIGH | HIGH | LARGE |

FIG.10

|   | CONDITION | COMPLEXITY OF CONTROL DEVICE 150 |
|---|---|---|
| (1) | RADIO WAVE RECEIVED FROM INFORMATION-PROVIDING DEVICE 300 IS RADIO WAVE IN PREDETERMINED PATTERN | SMALL |
| (2) | FREQUENCY OF RADIO WAVE RECEIVED FROM INFORMATION-PROVIDING DEVICE 300 IS INCLUDED IN DESIGNATED FREQUENCY BAND | LARGE |
| (3) | BOTH RADIO WAVES OF TWO DIFFERENT FREQUENCIES FROM INFORMATION-PROVIDING DEVICE 300 ARE RECEIVED | MEDIUM |
| (4) | BOTH RADIO WAVES OF TWO DIFFERENT POLARIZATIONS FROM INFORMATION-PROVIDING DEVICE 300 ARE RECEIVED | MEDIUM |
| (5) | CONDITION (1) AND CONDITION (3) ARE SATISFIED | LARGE |
| (6) | CONDITION (1) AND CONDITION (4) ARE SATISFIED | LARGE |

FIG.11

SYSTEM, INFORMATION-PROVIDING DEVICE, PROGRAM, AND INFORMATION-PROVIDING METHOD

The contents of the following patent application(s) are incorporated herein by reference:
NO. 2021-016285 filed in JP on Feb. 4, 2021
NO. PCT/JP2021/048700 filed in WO on Dec. 27, 2021

BACKGROUND

1. Technical Field

The present invention relates to a system, an information-providing device, a program, and an information-providing method.

2. Related Art

In Patent Document 1, a communication system using a HAPS (High Altitude Platform Station) is described.

PRIOR ART DOCUMENT

Patent Document

Patent Document 1: Japanese Patent Application Publication No. 2018-177135.

BRIEF DESCRIPTION OF THE DRAWINGS

FIG. 10 is a table for describing an example of an information-providing device 300.
FIG. 11 is a table for describing an example of processing performed by a control device 150.

DESCRIPTION OF EXEMPLARY EMBODIMENTS

Operations are required to be performed such that unnecessary radio wave radiation is avoided in the neighborhood of a country border and in an area where service areas of HAPS aircraft bodies overlap. A system 10 according to the present embodiment avoids unnecessary radio wave radiation to a neighboring country being a non-service target country and unnecessary radio wave radiation to an area where service areas of aircraft bodies overlap, for example, by being constantly informed of the neighborhood of a country border and an area where service target areas of HAPS aircraft bodies overlap. When receiving, for example, (1) location data of the aircraft body; (2) inclination data of the aircraft body; (3) speed data of the aircraft body, (4) polar coordinate data (SL (Service Link) coverage area calculation) calculated from the above (1) to (3); (5) location data of a country border; (6) unnecessary radio wave area calculated from the above (4) and (5); and (7) a radio wave of a target frequency band, the system 10 according to the present embodiment calculates a target area based on location data of a location guide transmission station having a function of radiating a radio wave including its own location information and physically adjusts an antenna and adjusts radio wave in the HAPS aircraft body.

Hereinafter, the invention will be described through embodiments of the invention, but the following embodiments do not limit the invention according to claims. In addition, not all of the combinations of features described in the embodiments are essential to the solution of the invention.

Figure 1:
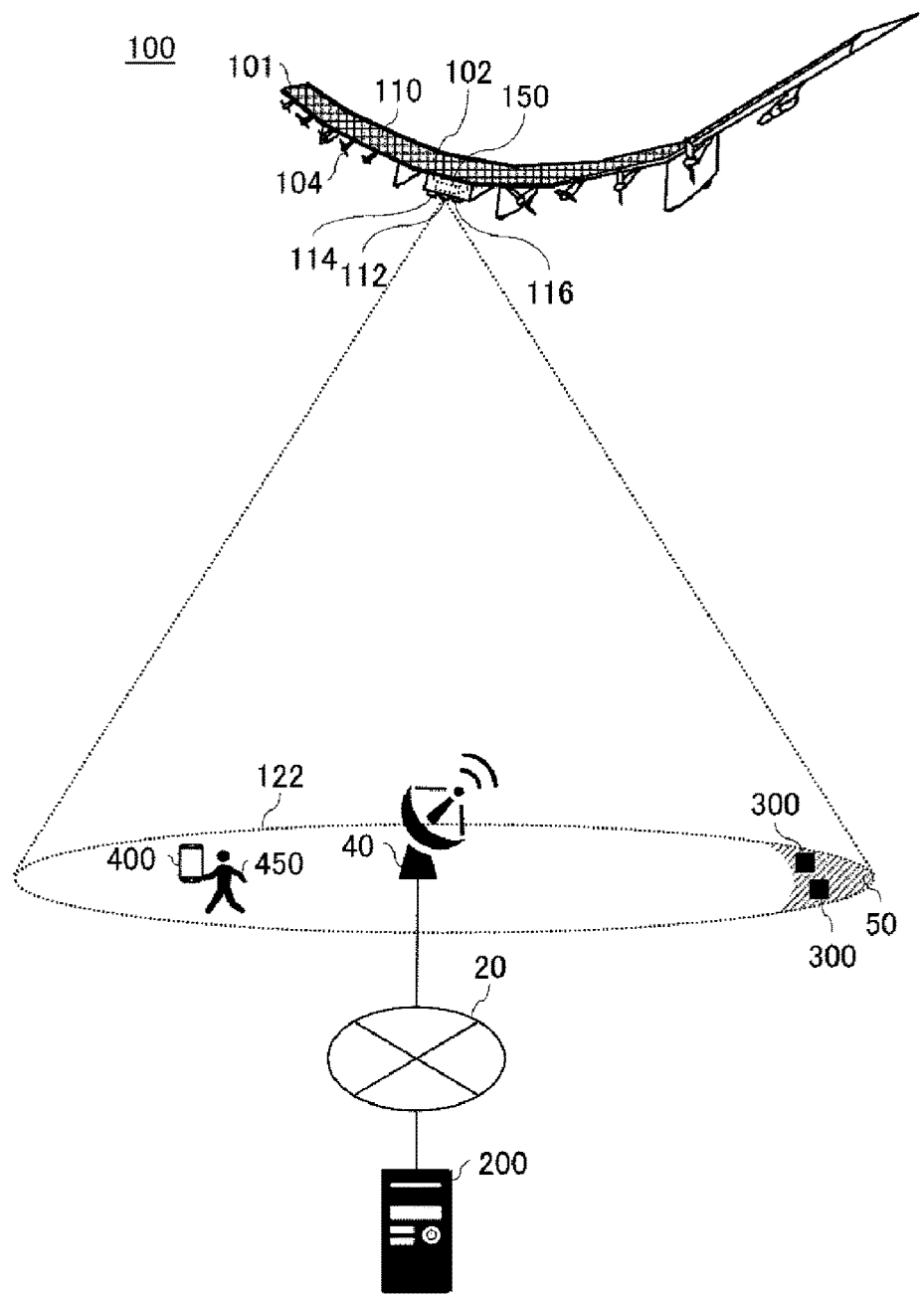
FIG. 1 schematically shows an example of a system 10.

FIG. 1 schematically shows an example of a system 10. The system 10 according to the present embodiment includes a flying object 100 and an information-providing device 300. The information-providing device 300 may be an example of the location guide transmission station. Although one flying object 100 is depicted in FIG. 1, the system 10 may include two or more flying objects 100. The system 10 may include a map information managing server 200. The system 10 may include a gateway 40.

The flying object 100 includes a main wing portion 101, a body portion 102, a propeller 104, a solar panel 110, an antenna 112, an antenna 114, and an antenna 116. The body portion 102 includes a control device 150, and a battery, which is not depicted. The battery stores electric power generated by the solar panel 110.

The control device 150 may control the flight of the flying object 100. The control device 150 causes the flying object 100 to fly by causing the propeller 104 to rotate by using the electric power stored in the battery, for example.

The control device 150 may radiate a beam by using the antenna 112 to form a wireless communication area 122 to provide a wireless communication service to a user terminal 400 in the wireless communication area 122. The control device 150 may establish a service link with the user terminal 400 in the wireless communication area 122 by using the antenna 112. The radio wave used for the service link may be a radio wave for which a license is necessary.

The frequency band of the radio wave used for the service link may be described as an "SL frequency band".

The user terminal 400 may be any terminal if it is a communication terminal that can communicate with the control device 150. For example, the user terminal 400 is a mobile phone such as a smartphone, a tablet terminal, a wearable terminal, or the like owned by a user 450. The user terminal 400 may also be a so-called IoT (Internet of Things) device. The user terminal 400 can include anything that corresponds to a so-called IoE (Internet of Everything).

The control device 150 may establish a wireless communication connection with the gateway 40 on the ground by using the antenna 114. For example, the control device 150 communicates with the map information managing server 200 via the gateway 40 and a network 20. The control device 150 may establish a wireless communication connection with another flying object 100 by using the antenna 116.

The network 20 may include a core network provided by a communication operator. The core network is compliant with an LTE (Long Term Evolution) communication system, for example. The core network may be compliant with a 5G (5th Generation) communication system, for example. The core network may be compliant with a mobile communication system of a 6G (6th Generation) communication system onwards. The core network may be compliant with a 3G (3rd Generation) communication system. The network 20 may include the Internet.

The map information managing server 200 manages map information. The map information includes country border information representing the location of a country border, for example. The country border information includes the latitude information and the longitude information of a country border, for example. The map information may include topography information representing topography at any spot.

The map information managing server 200 transmits the map information to the flying object 100 via the network 20. The map information managing server 200 may transmit the map information to the flying object 100 every time the map information is changed. The map information managing server 200 may transmit the map information to the flying object 100 in response to receiving a map information transmission request for requesting the transmission of the map information from the flying object 100.

The flying object 100 provides the wireless communication service to the user terminal 400 by flying in a stratosphere, for example. The flying object 100 may function as a stratosphere platform.

For example, while the flying object 100 circles around in the sky above an area to be covered, the wireless communication area 122 covers this area. In addition, for example, the wireless communication area 122 covers portions of the area to be covered while the flying object 100 moves in the sky above the area, such that the entire region is covered.

The flying object 100 sets one country as a service target country of the wireless communication service provided by the flying object 100, for example. The flying object 100 may set a plurality of countries as the service target countries of the wireless communication service provided by the flying object 100.

The control device 150 may have a function of obtaining the location information of the flying object 100. For example, the control device 150 obtains the location information of the flying object 100 by using GNSS (Global Navigation Satellite System) function.

The location information of the flying object 100 includes the latitude information of the flying object 100, for example. The location information of the flying object 100 includes the longitude information of the flying object 100, for example. The location information of the flying object 100 may include the altitude information of the flying object 100.

The control device 150 may have a function of obtaining the inclination information of the flying object 100. The control device 150 obtains the inclination information of the flying object 100 by using an inclination sensor, for example.

The inclination information of the flying object 100 includes information representing the roll angle of the flying object 100, for example. The inclination information of the flying object 100 includes information representing the pitch angle, for example. The inclination information of the flying object 100 includes information representing the yaw angle of the flying object 100, for example.

The control device 150 may have a function of obtaining the speed information of the flying object 100. The control device 150 obtains the speed information of the flying object 100 by using a speed sensor, for example.

The control device 150 may have a function of obtaining information related to the antenna 112. The information related to the antenna 112 includes the tilt information of the antenna 112, for example. The information related to the antenna 112 may include output intensity information representing the output intensity of the beam radiated by the antenna 112.

The control device 150 may have a function of obtaining information related to the antenna 114. The information related to the antenna 114 includes the tilt information of the antenna 114, for example. The information related to the antenna 114 may include output intensity information representing the output intensity of the beam radiated by the antenna 114. The control device 150 may have a function of obtaining information related to the antenna 116. The information related to the antenna 116 includes the tilt information of the antenna 116, for example. The information related to the antenna 116 may include output intensity information representing the output intensity of the beam radiated by the antenna 116.

The control device 150 may estimate an area that is on the ground and covered by the wireless communication area 122 formed by the antenna 112 by using obtained various types of information. The control device 150 estimates the area that is on the ground and covered by the wireless communication area 122 based on the location information and the inclination information of the flying object 100, the information related to the antenna 112, and the map information received from the map information managing server 200, for example.

The control device 150 may judge whether a non-target area 50 of the wireless communication service provided by the flying object 100 exists in the wireless communication area 122 based on the estimated area on the ground as being covered by the wireless communication area 122 and the map information received from the map information managing server 200. The control device 150 judges that the non-target area 50 exists in the wireless communication area 122 when the territory of a non-service target country is included in the estimated area on the ground, for example.

The control device 150 may control the flying object 100 in response to judging that the non-target area 50 exists in the wireless communication area 122. For example, the control device 150 controls the flying object 100 such that the non-target area 50 is not irradiated with the beam of the antenna 112.

The information-providing device 300 provides the flying object 100 with information used by the flying object 100 to judge whether the non-target area 50 exists in the wireless communication area 122. The information-providing device 300 provides the flying object 100 with this information by irradiating the flying object 100 with the radio wave, for example.

The information-providing devices 300 may be installed any distance apart. The information-providing devices 300 are installed 50 km apart, for example.

For example, the information-providing device 300 is installed in the vicinity of a border between a service target area of the wireless communication service and a non-service target area. For example, the information-providing device 300 is installed in the vicinity of a country border between a service target country and a non-service target country. FIG. 1 mainly illustrates a case where the information-providing device 300 is installed in the non-target area 50 as an example.

When receiving a beam from the flying object 100, the information-providing device 300 may irradiate the flying object 100 with a radio wave including a response signal to the received beam. For example, the information-providing device 300 irradiates the flying object 100 with the radio wave including the response signal to the received beam when the frequency of the beam received from the flying object 100 is a predetermined frequency band. The predetermined frequency band is an SL frequency band, for example. The information-providing device 300 does not irradiate the flying object 100 with the radio wave including the response signal to the received beam when the frequency of the beam received from the flying object 100 is not the predetermined frequency band.

The response signal includes installation location information representing the installation location of the information-providing device 300, for example. The response signal may include identification information for identifying the information-providing device 300.

The control device 150 may judge whether the non-target area 50 exists in the wireless communication area 122 further based on the response signal received from the information-providing device 300. The control device 150 may judge that the non-target area 50 exists in the wireless communication area 122 when receiving the radio wave including the response signal from the information-providing device 300, for example.

The control device 150 judges whether the non-target area 50 exists in the wireless communication area 122 further based on the installation location information included in the response signal when the response signal includes the installation location information, for example. For example, the control device 150 judges that the installation location of the information-providing device 300 represented by the installation location information is the non-target area 50.

The control device 150 may control the flying object 100 in response to judging that the non-target area 50 exists in the wireless communication area 122 based on the response signal received from the information-providing device 300. For example, the control device 150 controls the flying object 100 such that the wireless communication area 122 does not include the installation location of the information-providing device 300.

In a conventional system, a control device of a flying object providing a wireless communication service has estimated an area that is on the ground and covered by a wireless communication area formed by an antenna to control the flying object such that the wireless communication area does not include a non-target area of this wireless communication service. However, in the conventional system, it has been impossible for the control device to control the flying object in consideration of the area that is on the ground and actually covered by the wireless communication area. As a result, the conventional system has sometimes irradiated a non-target area of the wireless communication service provided by a flying object with a beam.

In contrast, according to the system 10 according to the present embodiment, the control device 150 judges whether the non-target area 50 exists in the wireless communication area 122 formed by the antenna 112 further based on the response signal received from the information-providing device 300. In this manner, the control device 150 can judge whether the non-target area 50 exists in the wireless communication area 122 in consideration of the area that is on the ground and actually covered by the wireless communication area 122. Accordingly, the system 10 according to the present embodiment can ensure that the beam of the flying object 100 is prevented from being radiated to a non-service target area. In particular, the system 10 according to the present embodiment can ensure that when the flying object 100 provides the wireless communication service in the vicinity of the country border of the service target country, the beam of the flying object 100 is prevented from being radiated to the territory of the neighboring country being the non-service target country.

Figure 2:
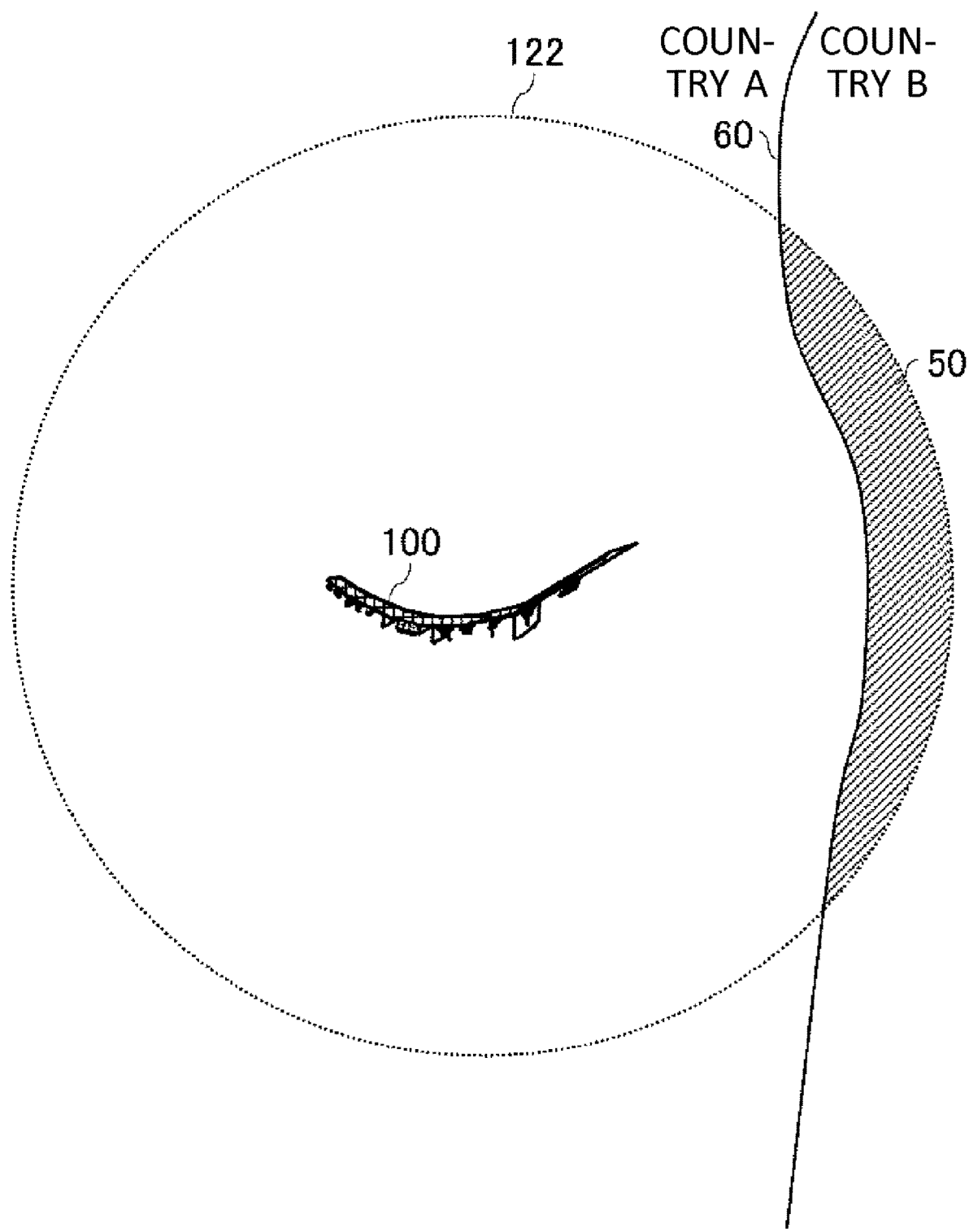
FIG. 2 is an illustration for describing an example of a non-target area 50.

FIG. 2 is an illustration for describing an example of a non-target area 50. FIG. 2 shows a case where country A is a service target country of a wireless communication service provided by a flying object 100 and country B being a neighboring country of country A is a non-service target country of the wireless communication service provided by the flying object 100. A country border 60 is the border between country A and country B. In FIG. 2, the non-target area 50 is a territory portion of country B in a wireless communication area 122 formed by the flying object 100.

Figure 3:
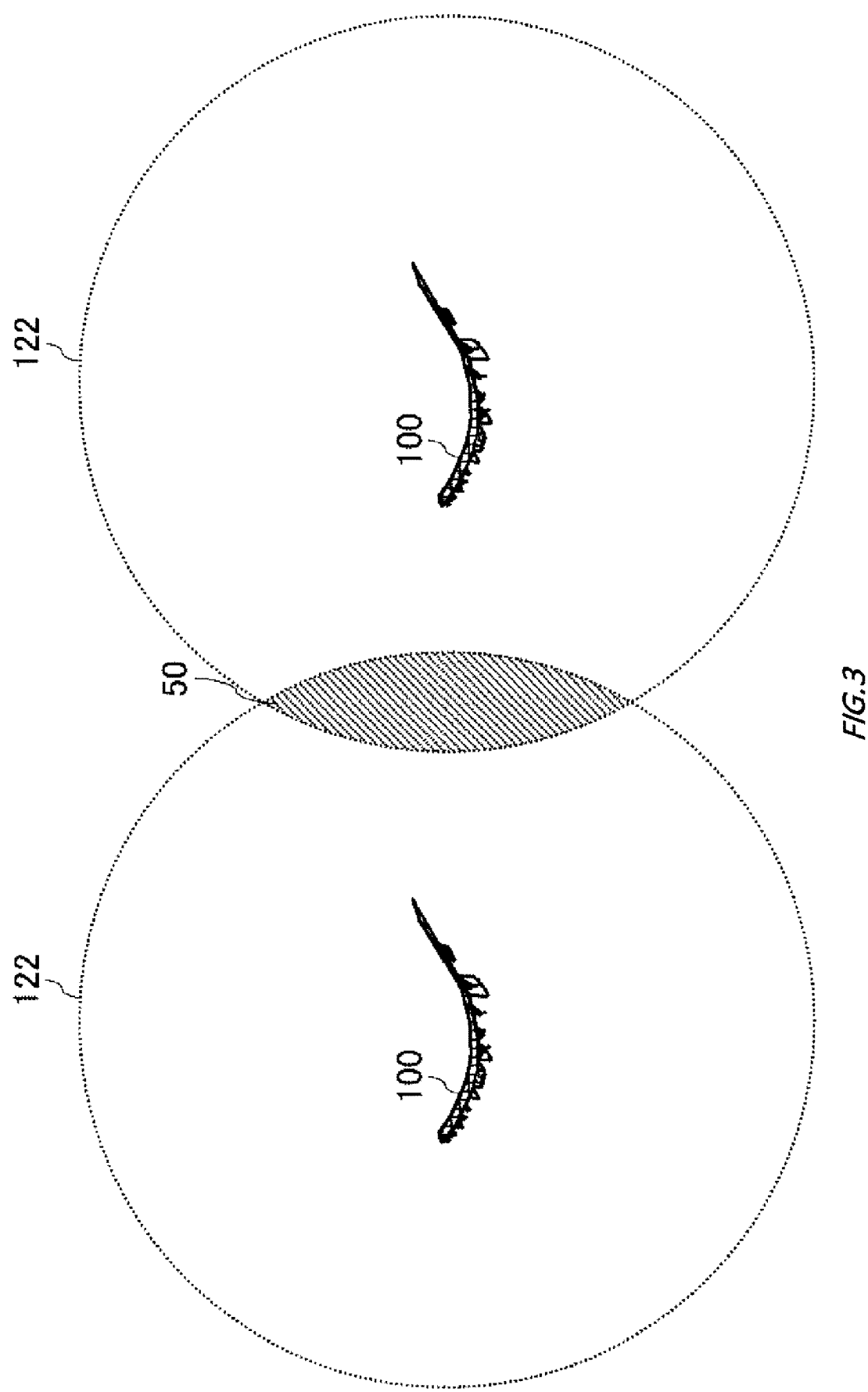
FIG. 3 is an illustration for describing another example of a non-target area 50.

FIG. 3 is an illustration for describing another example of a non-target area 50. FIG. 3 shows a case where two flying objects 100 are each providing a wireless communication service. In FIG. 3, a non-target area 50 is an area where wireless communication areas 122 respectively formed by the two flying objects 100 overlap.

Figure 4:
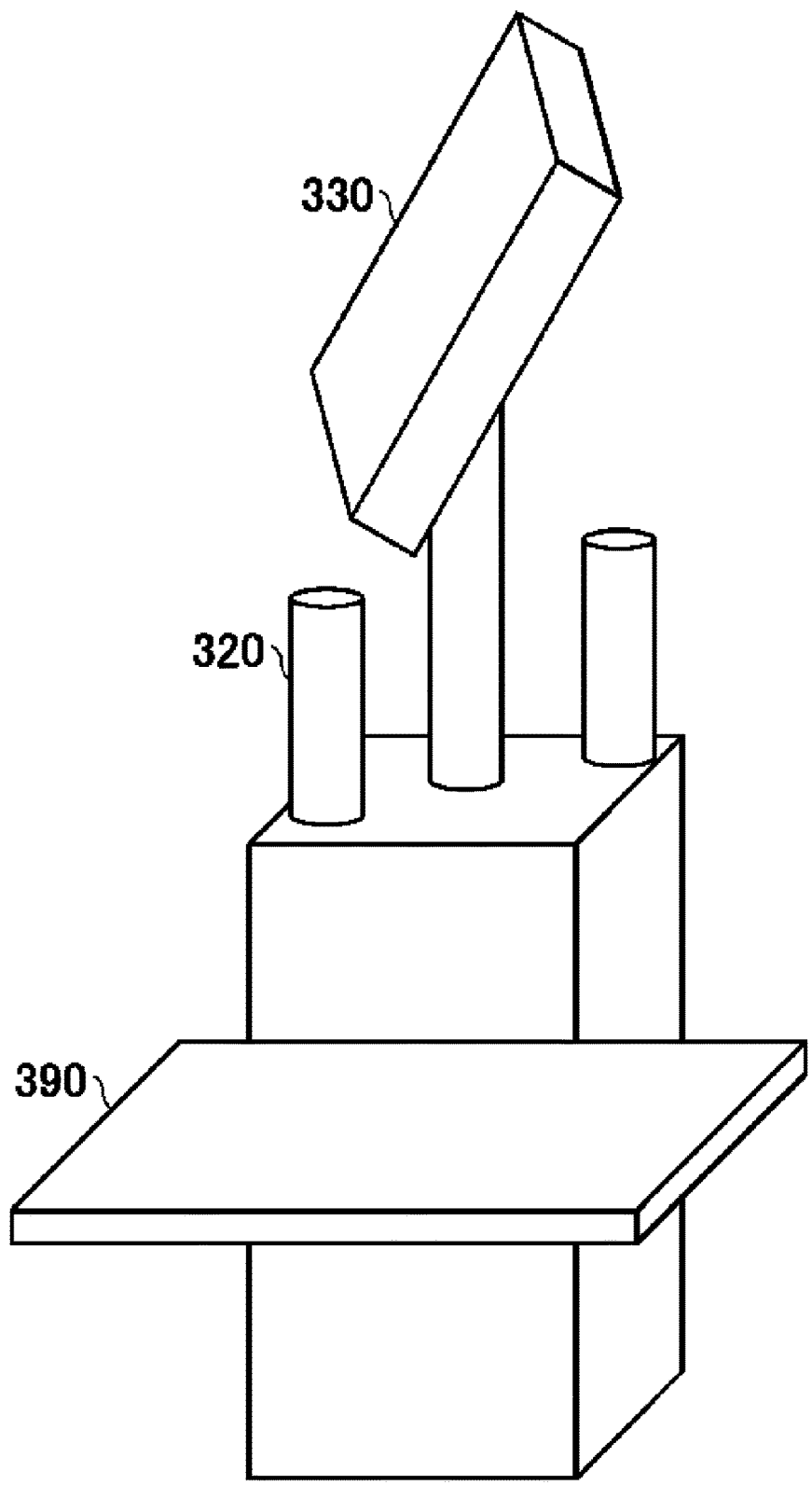
FIG. 4 schematically shows an example of an information-providing device 300.

FIG. 4 schematically shows an example of an information-providing device 300. The information-providing device 300 includes antenna 320, antenna 330, solar panel 390, and a battery, which is not depicted. Note that the information-providing device 300 does not necessarily include all of these components. In addition, the arrangement of each component shown in FIG. 4 is illustrative and not limiting.

The antenna 320 receives a beam radiated by a flying object 100. For example, the antenna 320 receives a beam of an SL frequency band.

The antenna 330 radiates a radio wave including a response signal to the beam received from the flying object 100. For example, the antenna 330 uses an LPWA (Low Power Wide Area) communication scheme to radiate the radio wave. The LPWA communication scheme is a communication scheme which covers a wide region with low electric power consumption. The radio wave used for the LPWA communication scheme may be a radio wave for which a license is unnecessary. The frequency band of the radio wave used for the LPWA communication scheme may be described as an "LPWA frequency band".

The antenna 330 is a directional antenna. The radiation direction of the radio wave radiated by the antenna 330 is adjusted by an installer or the like of the information-providing device 300, for example, when the information-providing device 300 is installed. For example, the radiation direction of the radio wave radiated by the antenna 330 is adjusted to cover the entire flight area of the flying object 100.

The solar panel 390 generates electric power from sunlight. The battery stores the electric power generated by the solar panel 390.

The information-providing device 300 may not have a function of receiving electric power from an external power supply. In this case, the antenna 320 receives a beam radiated by the flying object 100 by using the electric power of the battery. The antenna 330 radiates a radio wave including a response signal to the beam received from the flying object 100 by using the electric power of the battery.

Not having the function of receiving electric power from an external power supply, the information-providing device 300 can have a simple configuration. In this manner, the information-providing device 300 can be realized at a low cost. In addition, the information-providing device 300 receives a beam radiated by the flying object 100 and radiates a radio wave including a response signal to the received beam without receiving electric power from an external power supply. In this manner, the information-providing device 300 can be arranged in an area not well equipped with electric power facilities. Note that the information-providing device 300 may have the function of receiving electric power from an external power supply.

Figure 5:
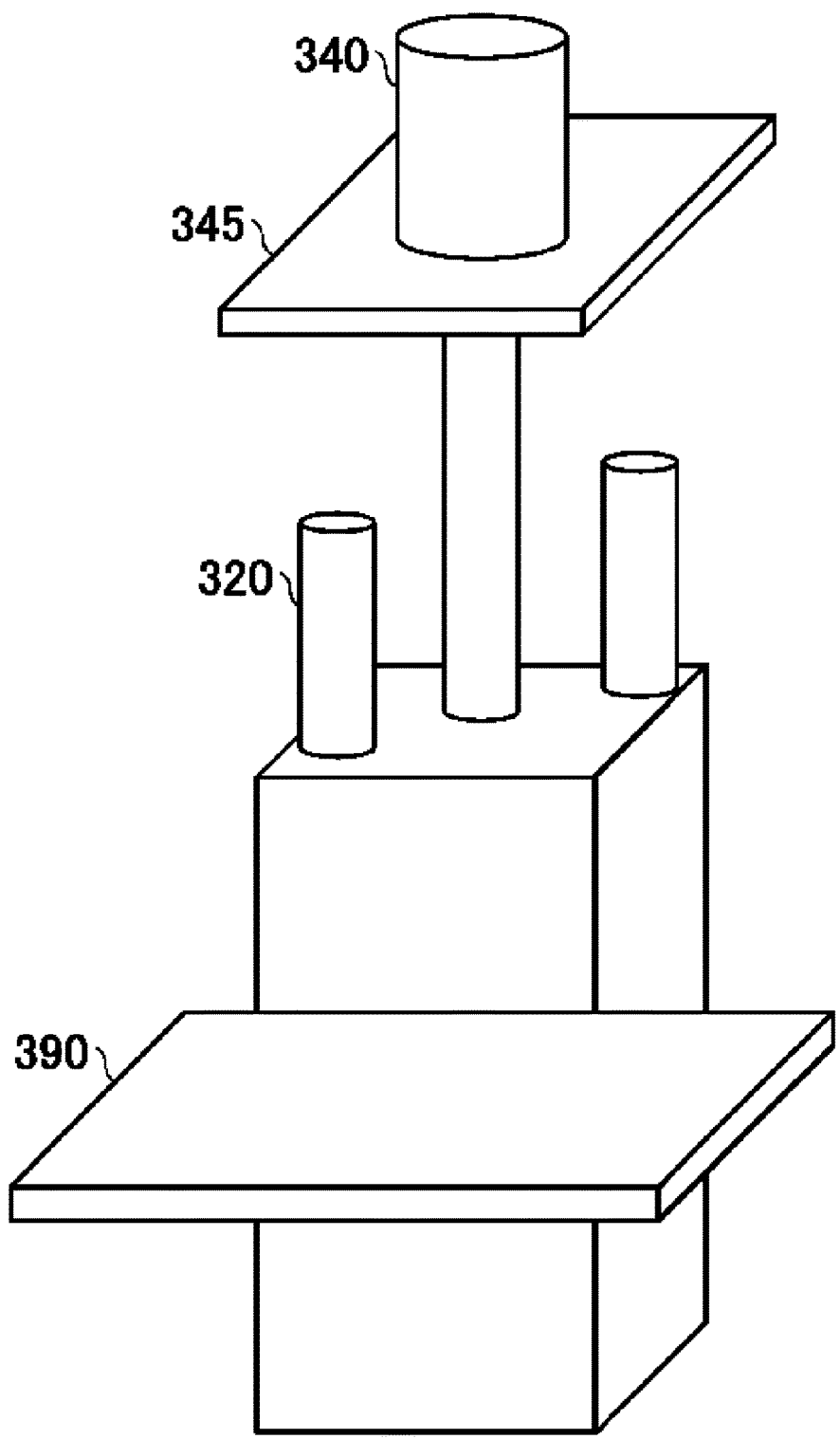
FIG. 5 schematically shows another example of an information-providing device 300.

FIG. 5 schematically shows another example of an information-providing device 300. The information-providing device 300 includes an antenna 320, an antenna 340, a reflector 345, a solar panel 390, and a battery, which is not depicted. Note that the information-providing device 300 does not necessarily include all of these components. In addition, the arrangement of each component shown in FIG. 5 is illustrative and not limiting. For FIG. 5, differences from FIG. 4 will mainly be described.

The antenna 340 radiates a radio wave including a response signal to a beam received from a flying object 100. For example, the antenna 340 radiates a radio wave of an LPWA frequency band.

The antenna 340 is an omnidirectional antenna. The antenna 340 may use the electric power of the battery to radiate the radio wave including the response signal to the beam received from the flying object 100.

The reflector 345 reflects the radio wave radiated by the antenna 340. The reflector 345 is arranged such that the antenna 320 does not receive the radio wave radiated by the antenna 340, for example.

Figure 6:
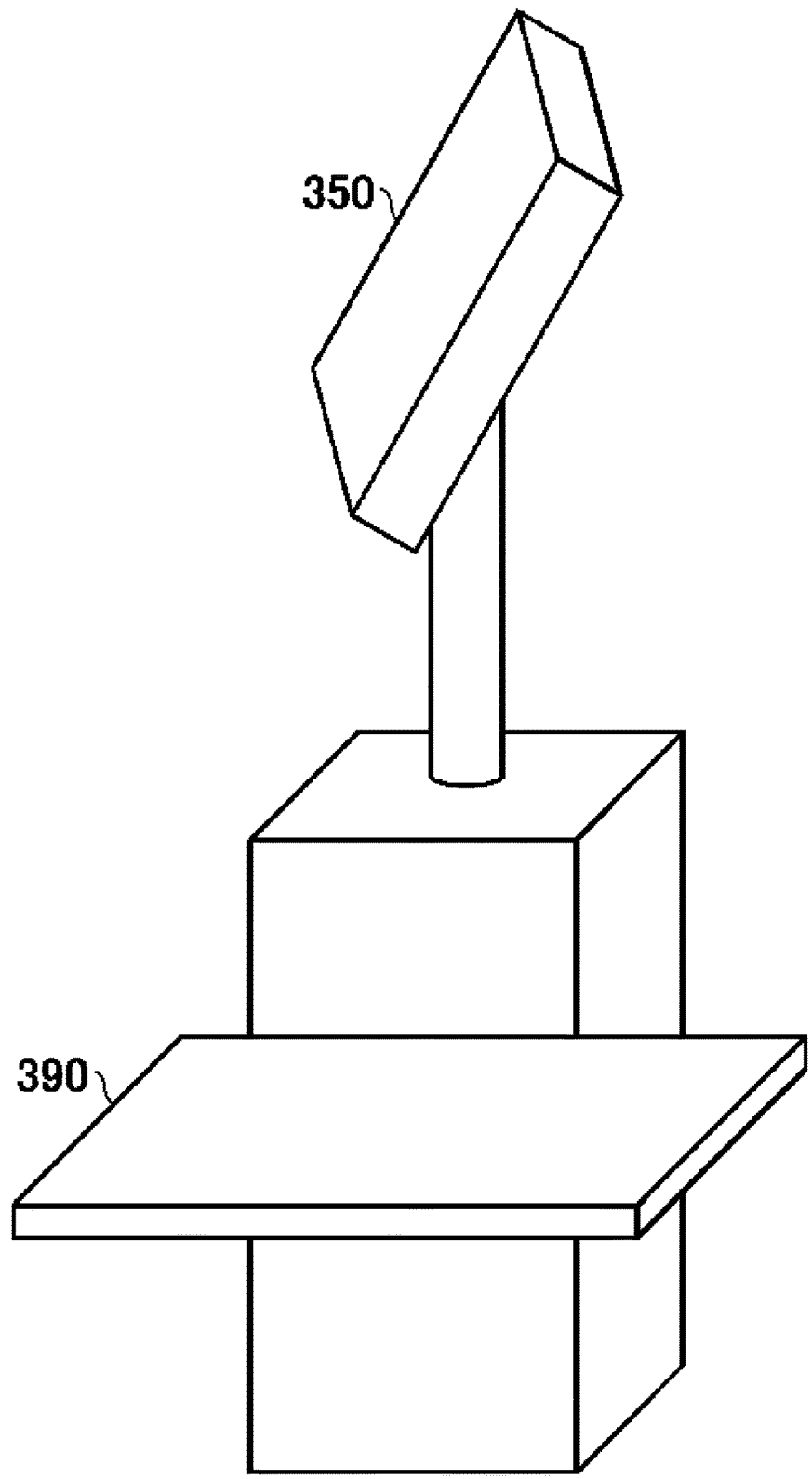
FIG. 6 schematically shows another example of an information-providing device 300.

FIG. 6 schematically shows another example of an information-providing device 300. The information-providing device 300 includes an antenna 350, a solar panel 390, and a battery, which is not depicted. Note that the information-providing device 300 does not necessarily include all of these components. In addition, the arrangement of each component shown in FIG. 6 is illustrative and not limiting. For FIG. 6, differences from FIG. 4 and FIG. 5 will mainly be described.

The antenna 350 receives a beam radiated by a flying object 100. For example, the antenna 350 receives a radio wave of an SL frequency band.

The antenna 350 radiates a radio wave including a response signal to the beam received from the flying object 100. The antenna 350 radiates a radio wave of an SL frequency band, for example.

The antenna 350 is a directional antenna. The radiation direction of the radio wave radiated by the antenna 350 is adjusted by an installer or the like of the information-providing device 300, for example, when the information-providing device 300 is installed. For example, the radiation direction of the radio wave radiated by the antenna 350 is adjusted to cover the entire flight area of the flying object 100.

The antenna 350 may receive the beam radiated by the flying object 100 by using the electric power of the battery. The antenna 350 may use the electric power of the battery to radiate the radio wave including the response signal to the beam received from the flying object 100.

Figure 7:
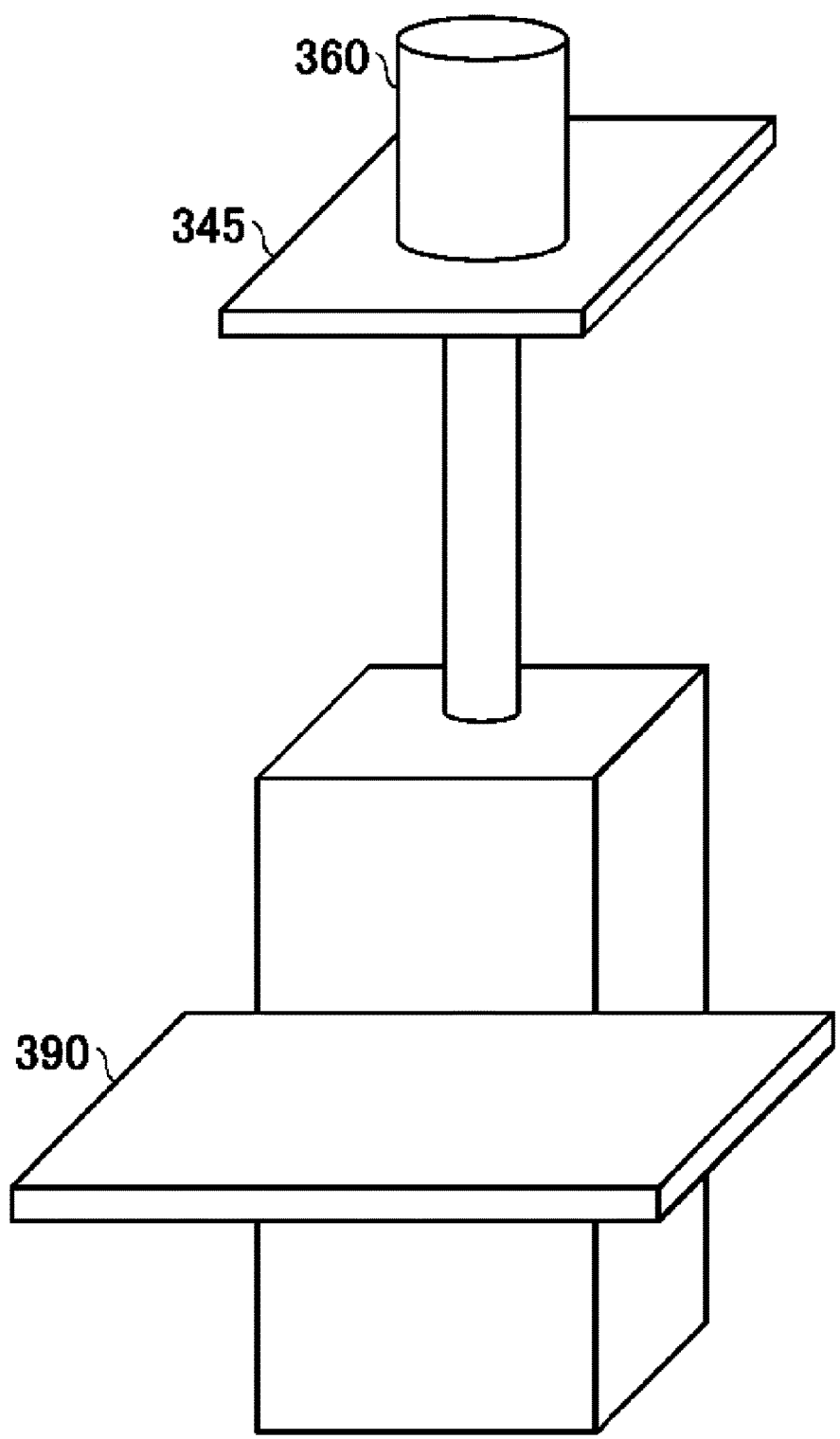
FIG. 7 schematically shows another example of an information-providing device 300.

FIG. 7 schematically shows another example of an information-providing device 300. The information-providing device 300 includes a reflector 345, an antenna 360, a solar panel 390, and a battery, which is not depicted. Note that the information-providing device 300 does not necessarily include all of these components. In addition, the arrangement of each component shown in FIG. 7 is illustrative and not limiting. For FIG. 7, differences from FIG. 4 to FIG. 6 will mainly be described.

The antenna 360 receives a beam radiated by a flying object 100. For example, the antenna 360 receives a radio wave of an SL frequency band.

The antenna 360 radiates a radio wave including a response signal to the beam received from the flying object 100. The antenna 360 radiates a radio wave of an SL frequency band, for example.

The antenna 360 is an omnidirectional antenna. The antenna 360 may receive the beam radiated by the flying object 100 by using the electric power of the battery. The antenna 360 may use the electric power of the battery to radiate the radio wave including the response signal to the beam received from the flying object 100.

Figure 8:
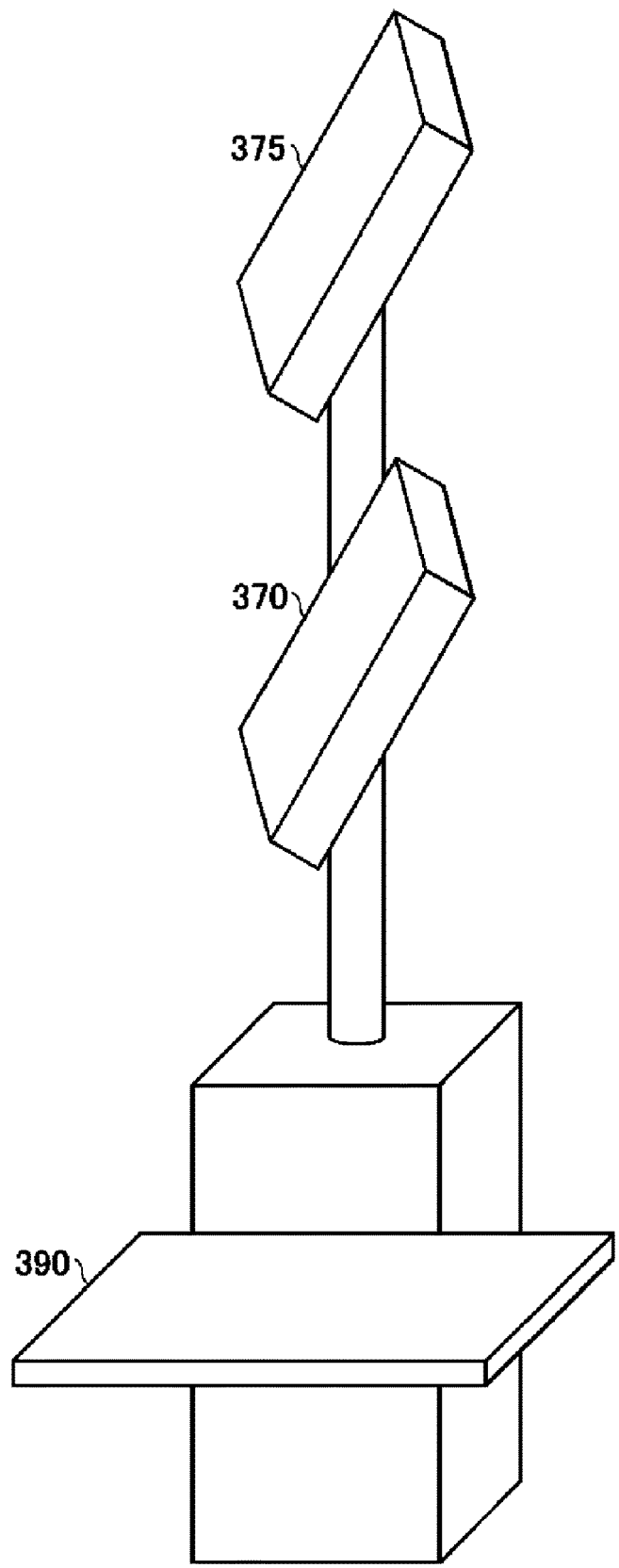
FIG. 8 schematically shows another example of an information-providing device 300.

FIG. 8 schematically shows another example of an information-providing device 300. The information-providing device 300 includes an antenna 370, an antenna 375, a solar panel 390, and a battery, which is not depicted. Note that the information-providing device 300 does not necessarily include all of these components. In addition, the arrangement of each component shown in FIG. 8 is illustrative and not limiting. For FIG. 8, differences from FIG. 4 to FIG. 7 will mainly be described.

The antenna 370 receives a beam radiated by a flying object 100. For example, the antenna 370 receives a radio wave of an SL frequency band.

The antenna 370 radiates a radio wave including a response signal to the beam received from the flying object 100. The antenna 370 radiates a radio wave of an SL frequency band.

The antenna 370 is an directional antenna. The radiation direction of the radio wave radiated by the antenna 370 is adjusted by an installer or the like of the information-providing device 300, for example, when the information-providing device 300 is installed. For example, the radiation direction of the radio wave radiated by the antenna 370 is adjusted to cover the entire flight area of the flying object 100.

The antenna 370 may receive the beam radiated by the flying object 100 by using the electric power of the battery. The antenna 370 may use the electric power of the battery to radiate the radio wave including the response signal to the beam received from the flying object 100.

The antenna 375 radiates a radio wave including a response signal to the beam received from the flying object 100. The antenna 375 uses an LPWA communication scheme to radiate the radio wave.

The antenna 375 is an directional antenna. The radiation direction of the radio wave radiated by the antenna 375 is adjusted by an installer or the like of the information-providing device 300, for example, when the information-providing device 300 is installed. For example, the radiation direction of the radio wave radiated by the antenna 375 is adjusted to cover the entire flight area of the flying object 100.

The information-providing device 300 selects an antenna for radiating the radio wave including the response signal to the beam received from the flying object 100 from the antenna 370 and the antenna 375. For example, the information-providing device 300 selects either of the antenna 370 and the antenna 375 by accepting, by an input device not depicted, an input from an administrator or the like of the information-providing device 300.

Figure 9:
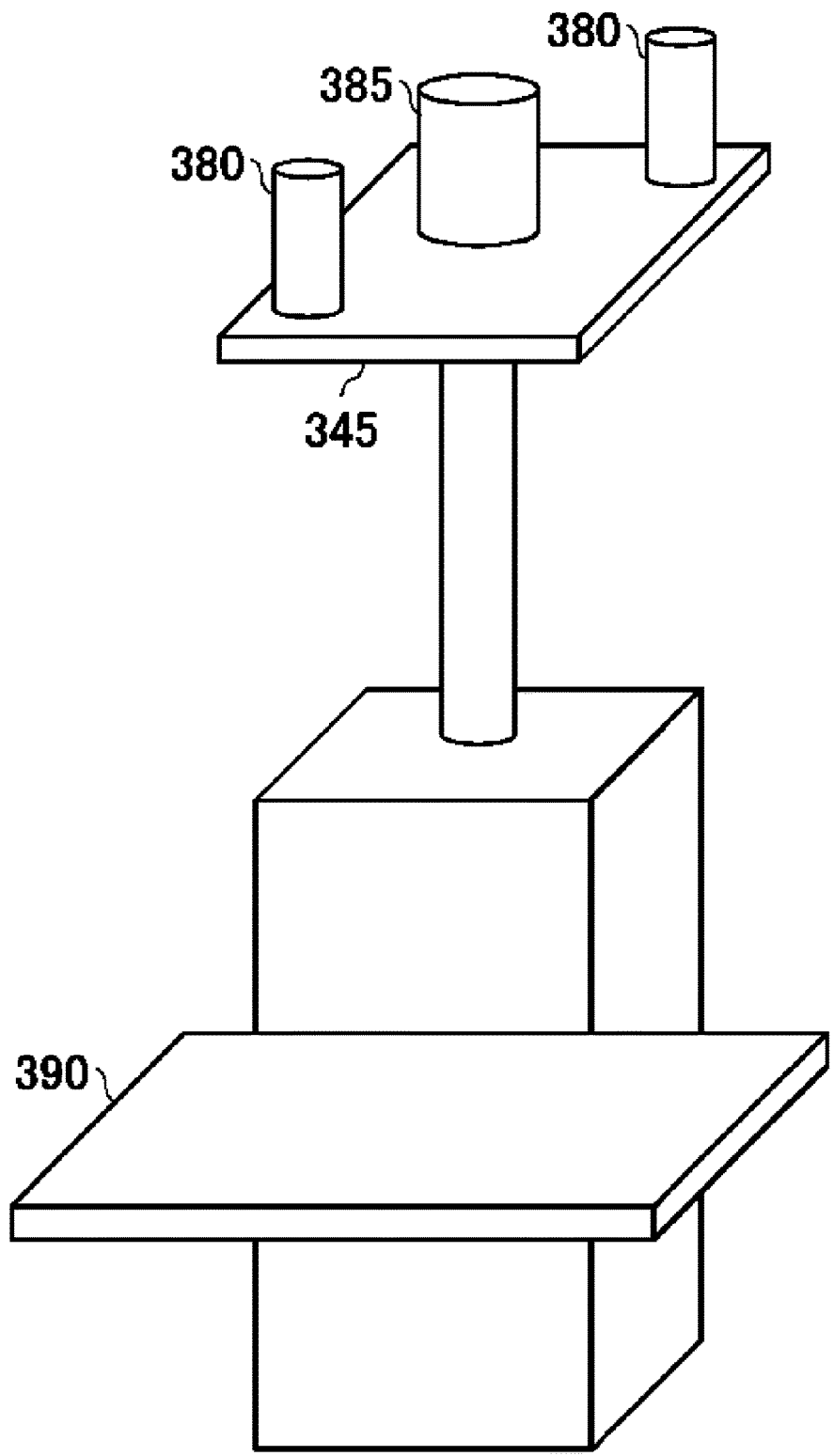
FIG. 9 schematically shows another example of an information-providing device 300.

FIG. 9 schematically shows another example of an information-providing device 300. The information-providing device 300 includes an antenna 380, a reflector 345, an antenna 385, a solar panel 390, and a battery, which is not depicted. Note that the information-providing device 300 does not necessarily include all of these components. In addition, the arrangement of each component shown in FIG. 9 is illustrative and not limiting. For FIG. 9, differences from FIG. 4 to FIG. 8 will mainly be described.

The antenna 380 receives a beam radiated by a flying object 100. For example, the antenna 380 receives a radio wave of an SL frequency band.

The antenna 380 radiates a radio wave including a response signal to the beam received from the flying object 100. The antenna 380 radiates a radio wave of an SL frequency band.

The antenna 380 is an omnidirectional antenna. The antenna 380 may receive the beam radiated by the flying object 100 by using the electric power of the battery. The antenna 380 may use the electric power of the battery to radiate the radio wave including the response signal to the beam received from the flying object 100.

The antenna 385 radiates a radio wave including a response signal to the beam received from the flying object 100. The antenna 385 radiates a radio wave of an LPWA frequency band.

The antenna 385 is an omnidirectional antenna. The antenna 385 may use the electric power of the battery to radiate the radio wave including the response signal to the beam received from the flying object 100.

The information-providing device 300 selects an antenna for radiating the radio wave including the response signal to the beam received from the flying object 100 from the antenna 380 and the antenna 385. For example, the information-providing device 300 selects either of the antenna 380 and the antenna 385 by accepting, by an input device not depicted, an input from an administrator or the like of the information-providing device 300.

FIG. 10 is a table for describing an example of an information-providing device 300. FIG. 10 illustrates the information-providing devices 300 of FIG. 4 to FIG. 9.

The "type" in the table of FIG. 10 represents the type of an information-providing device 300. Information-providing devices 300 of the "simple type" correspond to the information-providing devices 300 of FIG. 4 and FIG. 5. Information-providing devices 300 of the "standard type" correspond to the information-providing devices 300 of FIG. 6 and FIG. 7. Information-providing devices 300 of the "hybrid type" correspond to the information-providing devices 300 of FIG. 8 and FIG. 9.

The "frequency band" in the table of FIG. 10 represents the frequency band of a radio wave radiated to a flying object 100 by an information-providing device 300. The information-providing device 300 of the simple type radiates a radio wave of an LPWA frequency band. The information-providing device 300 of the standard type radiates a radio wave of an SL frequency band. The information-providing device 300 of the hybrid type radiates a radio wave of a frequency band selected from the radio wave of the LPWA frequency band and the radio wave of the SL frequency band.

The "power consumption" in the table of FIG. 10 represents the power consumption of an information-providing device 300. The power consumption of the information-providing device 300 of the simple type is a minimum. The power consumption of the information-providing device 300 of the standard type is small to medium. The power consumption of the information-providing device 300 of the hybrid type is large.

The "license" in the table of FIG. 10 represents whether a license of a radio wave radiated to a flying object 100 by an information-providing device 300 is necessary. The radio wave radiated by the information-providing device 300 of the simple type is a radio wave for which a license is unnecessary. The radio wave radiated by the information-providing device 300 of the standard type is a radio wave for which a license is necessary. The radio wave radiated by the information-providing device 300 of the hybrid type is a radio wave for which a license is unnecessary when the radio wave of the LPWA frequency band is selected, and is a radio wave for which a license is necessary when the radio wave of the SL frequency band is selected.

The "interference" in the table of FIG. 10 represents the possibility that a radio wave radiated to a flying object 100 by an information-providing device 300 is interfered with another radio wave. The radio wave radiated by the information-providing device 300 of the simple type is a radio wave having a large possibility of interference. The radio wave radiated by the information-providing device 300 of the standard type is a radio wave having a small possibility of interference. The radio wave radiated by the information-providing device 300 of the hybrid type is a radio wave having a large possibility of interference when the radio wave of the LPWA frequency band is selected, and is a radio wave having a small possibility of interference when the radio wave of the SL frequency band is selected.

The "circuit design" in the table of FIG. 10 represents the complexity of a circuit with which an information-providing device 300 is equipped. The circuit with which the information-providing device 300 of the simple type is equipped is a circuit having low complexity. The circuit with which the information-providing device 300 of the standard type is equipped is a circuit having low complexity. The circuit with which the information-providing device 300 of the hybrid type is equipped is a circuit having high complexity.

The "maintenance" in the table of FIG. 10 represents the cost required for maintenance of an information-providing device 300. The cost required for the maintenance of the information-providing device 300 of the simple type is low cost. The cost required for the maintenance of the information-providing device 300 of the standard type is low cost. The cost required for the maintenance of the information-providing device 300 of the hybrid type is high cost.

The "device scale" in the table of FIG. 10 represents the scale of an information-providing device 300. The device scale of the information-providing device 300 of the simple type is medium scale. The device scale of the information-providing device 300 of the standard type is small scale. The device scale of the information-providing device 300 of the hybrid type is large scale.

FIG. 11 is a table for describing an example of processing performed by a control device 150. The "condition" in FIG. 11 is a condition for the control device 150 to determine that a radio wave received by the control device 150 is a radio wave radiated by an information-providing device 300.

The condition (1) in the table of FIG. 11 is that the radio wave received by the control device 150 from the information-providing device 300 is a radio wave in a predetermined pattern. In this case, the information-providing device 300 radiates a radio wave according to a predetermined pattern by radiating a radio wave intermittently. The predetermined pattern is a pattern in units of msec, for example.

The condition (2) in the table of FIG. 11 is that the frequency of the radio wave received by the control device 150 from the information-providing device 300 is included in a frequency band designated by the control device 150. In this case, for the information-providing device 300, the control device 150 designates a frequency band that the control device 150 has not received from other information-providing devices 300 or the like as the frequency band of the radio wave to be radiated to the flying object 100 by the information-providing device 300. The information-providing device 300 radiates a radio wave of the frequency included in the frequency band designated by the control device 150.

The condition (3) in the table of FIG. 11 is that the control device 150 receives both of the radio waves of two different frequencies from the information-providing device 300. In this case, the information-providing device 300 radiates the radio waves of two different frequencies.

The condition (4) in the table of FIG. 11 is that the control device 150 receives both of radio waves of two different polarizations from the information-providing device 300. In this case, the information-providing device 300 radiates radio waves of two different polarizations. For example, radio waves of the two different polarizations are a radio wave of linear polarization and a radio wave of horizontal polarization. The radio waves of two different polarizations may be a radio wave of left-handed polarization and a radio wave of right-handed polarization.

The condition (5) in the table of FIG. 11 is to satisfy the condition (1) and the condition (3). In this case, the information-providing device 300 radiates radio waves of two different frequencies according to predetermined patterns respectively, by radiating each of the radio waves of two different frequencies intermittently.

The condition (5) in the table of FIG. 11 is to satisfy the condition (1) and the condition (4). In this case, the information-providing device 300 radiates radio waves of two different polarizations according to predetermined patterns respectively, by radiating each of the radio waves of two different polarizations intermittently.

According to the system 10 according to the present embodiment, the control device 150 determines that only the radio wave that satisfied a condition in the table of FIG. 11 is a radio wave radiated by the information-providing device 300 among the received radio waves. In this manner, the system 10 according to the present embodiment can prevent the interference of the radio wave radiated by the information-providing device 300. In particular, the system 10 according to the present embodiment is effective when the information-providing device 300 radiates the radio wave of the LPWA frequency band having a large possibility of interference.

Figure 12:
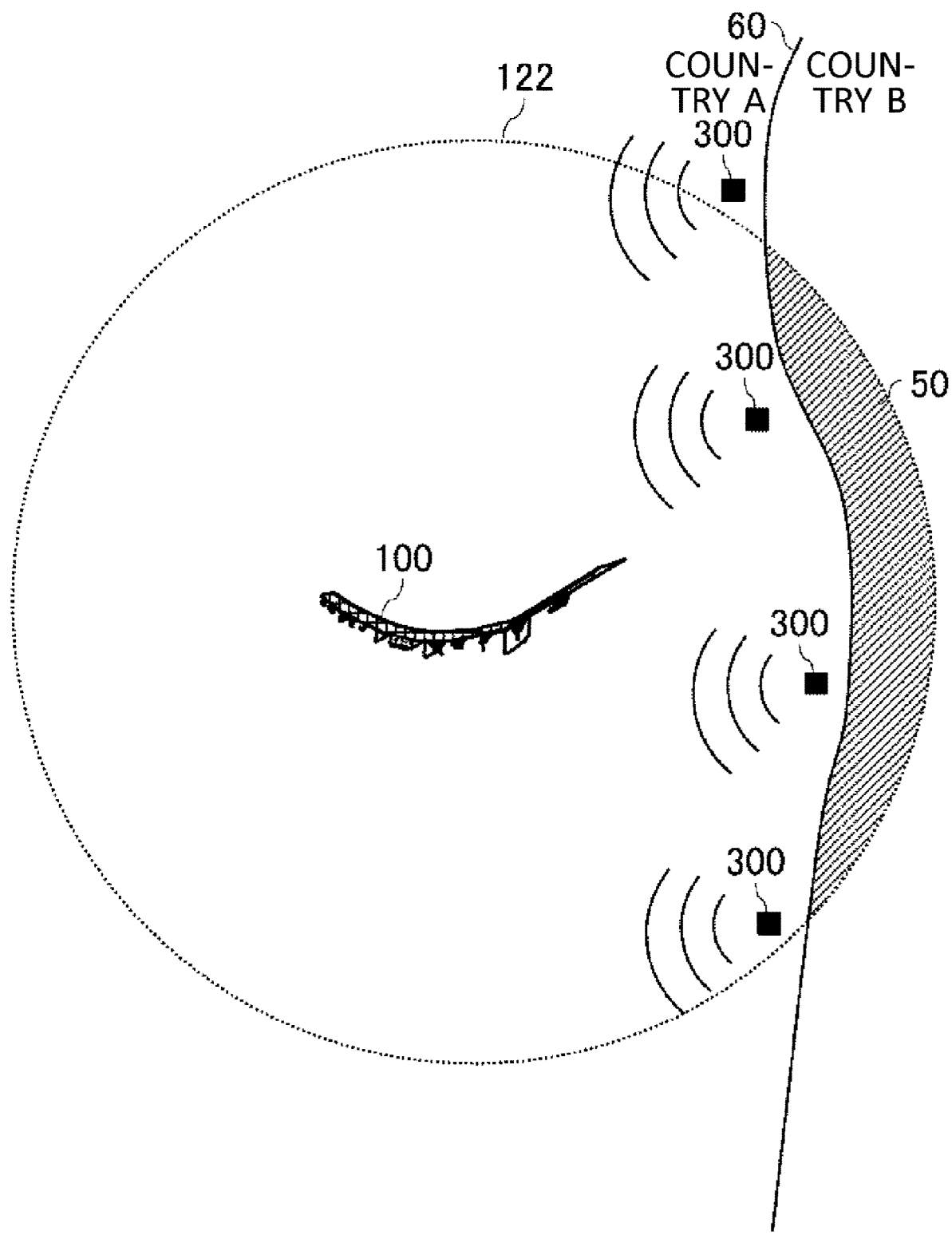
FIG. 12 is an illustration for describing an example of processing performed by a flying object 100 and an information-providing device 300.

FIG. 12 is an illustration for describing an example of processing performed by a flying object 100 and an information-providing device 300. FIG. 12 illustrates a case where country A is a service target country of a wireless communication service provided by a flying object 100 and country B being a neighboring country of country A is a non-service target country of the wireless communication service provided by the flying object 100 as an example.

For example, the information-providing device 300 is installed in the vicinity of a country border 60 in country A being the target area of the wireless communication service provided by the flying object 100. When a frequency of a beam received from the flying object 100 is a predetermined frequency band, the information-providing device 300 may measure the signal intensity of this beam. The information-providing device 300 may radiate a radio wave including a response signal including signal intensity information representing the measured signal intensity. The information-providing device 300 uses a directional antenna to radiate this radio wave, for example.

When receiving the radio wave including the response signal from the information-providing device 300, a control device 150 judges that a wireless communication area 122 includes the installation location of the information-providing device 300. The control device 150 judges whether the signal intensity represented by the signal intensity information included in the response signal is higher than a predetermined signal intensity threshold. When judging that this signal intensity is higher than the signal intensity threshold, the control device 150 judges that a non-target area 50 exists in the wireless communication area 122. When judging that the signal intensity is not higher than the signal intensity threshold, the control device 150 judges that the non-target area 50 does not exist in the wireless communication area 122.

In response to judging that the non-target area 50 exists in the wireless communication area 122, the control device 150 controls the flying object 100 such that the non-target area 50 is not irradiated with the beam of the flying object 100. For example, the control device 150 controls the tilt of an antenna 112 based on the location information of the flying object 100, the installation location information of the information-providing device 300, and the response information including the signal intensity information of the information-providing device 300. For example, the control device 150 controls the tilt of the antenna 112 to such a direction that the signal intensity represented by the signal intensity information of the information-providing device 300 decreases. For example, the control device 150 controls the tilt of the antenna 112 until the signal intensity represented by the signal intensity information of the information-providing device 300 becomes lower than the signal intensity threshold.

The control device 150 may control the output intensity of the antenna 112 based on the response signal including the signal intensity information of the information-providing device 300. For example, the control device 150 decreases the output intensity of the antenna 112 until the signal intensity represented by the signal intensity information of the information-providing device 300 becomes lower than the signal intensity threshold.

According to the system 10 according to the present embodiment, the information-providing device 300 measures the signal intensity of the beam received from the flying object 100. The control device 150 judges whether the non-target area 50 exists in the wireless communication area 122 by judging whether the signal intensity of the beam measured by the information-providing device 300 is higher than a predetermined signal intensity threshold. In this manner, even when it is impossible to install the information-providing device 300 in the non-service target area, the system 10 according to the present embodiment can ensure that the beam of the flying object 100 is prevented from being radiated to the non-service target area.

In FIG. 12, the information-providing device 300 may be installed in the territory of country B being the non-target area 50 when country B permits the information-providing device 300 to be installed in the territory of country B. In this case, the control device 150 may judge that the non-target area 50 exists in the wireless communication area 122 when receiving the radio wave including the response signal from the information-providing device 300.

Figure 13:
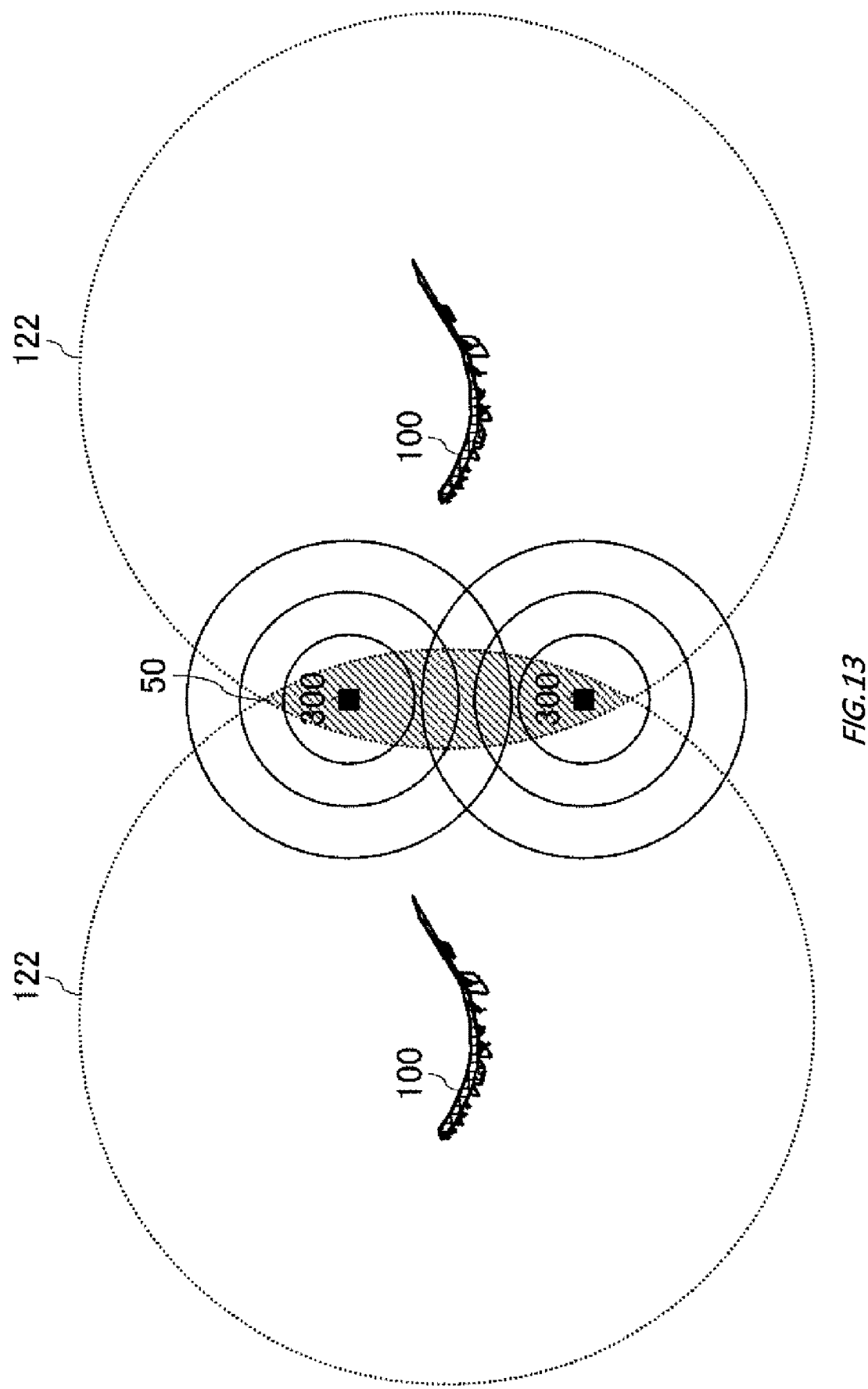
FIG. 13 is an illustration for describing another example of processing performed by a flying object 100 and an information-providing device 300.

FIG. 13 is an illustration for describing another example of processing performed by a flying object 100 and an information-providing device 300. FIG. 13 illustrates a case where two flying objects 100 are each providing a wireless communication service as an example.

An information-providing device 300 is installed in a possible area where wireless communication areas 122 respectively formed by the two flying objects 100 may overlap, for example. When receiving both of the beams of the two flying objects 100 within a predetermined period, the information-providing device 300 may radiate a radio wave including a response signal to these beams. For example, the information-providing device 300 radiates a radio wave including a response signal including information representing the fact of receiving the radio waves from the two flying objects 100. The information-providing device 300 may radiate a radio wave including a response signal including signal intensity information representing the signal intensities of the beams each received from the two flying objects 100. For example, the information-providing device 300 uses an omnidirectional antenna to radiate this radio wave.

When receiving a radio wave including a response signal from the information-providing device 300, a control device 150 may judge that a non-target area 50 that is an area where the wireless communication area 122 of the flying object 100 equipped with this control device 150 and a wireless communication area 122 of another flying object 100 overlap exists in the wireless communication area 122 of the flying object 100 equipped with this control device 150.

The control device 150 may determine a flying object 100 to change its wireless communication area 122 in response to judging that the non-target area 50 exists. For example, the control device 150 receives, from the another flying object 100, information representing the number of user terminals 400 in the wireless communication area 122 of the another flying object 100. The control device 150 compares the number of user terminals 400 in the wireless communication area 122 of the flying object 100 equipped with this control device 150 and the number of user terminals 400 in the wireless communication area 122 of the another flying object 100 represented by the information received from the another flying object 100. When the number of user terminals 400 in the wireless communication area 122 of this flying object 100 is less than the number of user terminals 400 in the wireless communication area 122 of the another flying object 100, the control device 150 determines that this flying object 100 is to change its wireless communication area 122. When the number of user terminals 400 in the wireless communication area 122 of this flying object 100 is not less than the number of user terminals 400 in the wireless communication area 122 of the another flying object 100, the control device 150 determines that the another flying object 100 is to change its wireless communication area 122.

When determining that this flying object 100 is to change its wireless communication area 122, the control device 150 transmits a change notice to notify that this flying object 100 is to change its wireless communication area 122 to the another flying object 100. Subsequently, the control device 150 controls this flying object 100 such that the wireless communication area 122 of this flying object 100 does not overlap with the wireless communication area 122 of the another flying object 100. For example, the control device 150 controls this flying object 100 such that the wireless communication area 122 of this flying object 100 does not include the installation location of the information-providing device 300.

For example, the control device 150 controls a tilt of an antenna 112 based on the location information of this flying object 100, the installation location information of the information-providing device 300, the response signal including the signal intensity information of the beam radiated by this flying object 100. For example, the control device 150 controls the tilt of the antenna 112 to such a direction that the signal intensity represented by the signal intensity information decreases. For example, the control device 150 controls the tilt of the antenna 112 until the information-providing device 300 ceases to receive the beam of this flying object 100.

The control device 150 may control the output intensity of the antenna 112 based on the response signal including the signal intensity information. For example, the control device 150 decreases the output intensity of the antenna 112 until the information-providing device 300 ceases to receive the beam of this flying object 100.

When determining that the another flying object 100 is to change its wireless communication area 122, the control device 150 requests the another flying object 100 to change its wireless communication area 122. In response to the request from this flying object 100, the another flying object 100 controls the another flying object 100 such that the wireless communication area 122 of the another flying object 100 does not overlap with the wireless communication area 122 of this flying object 100.

Figure 14:
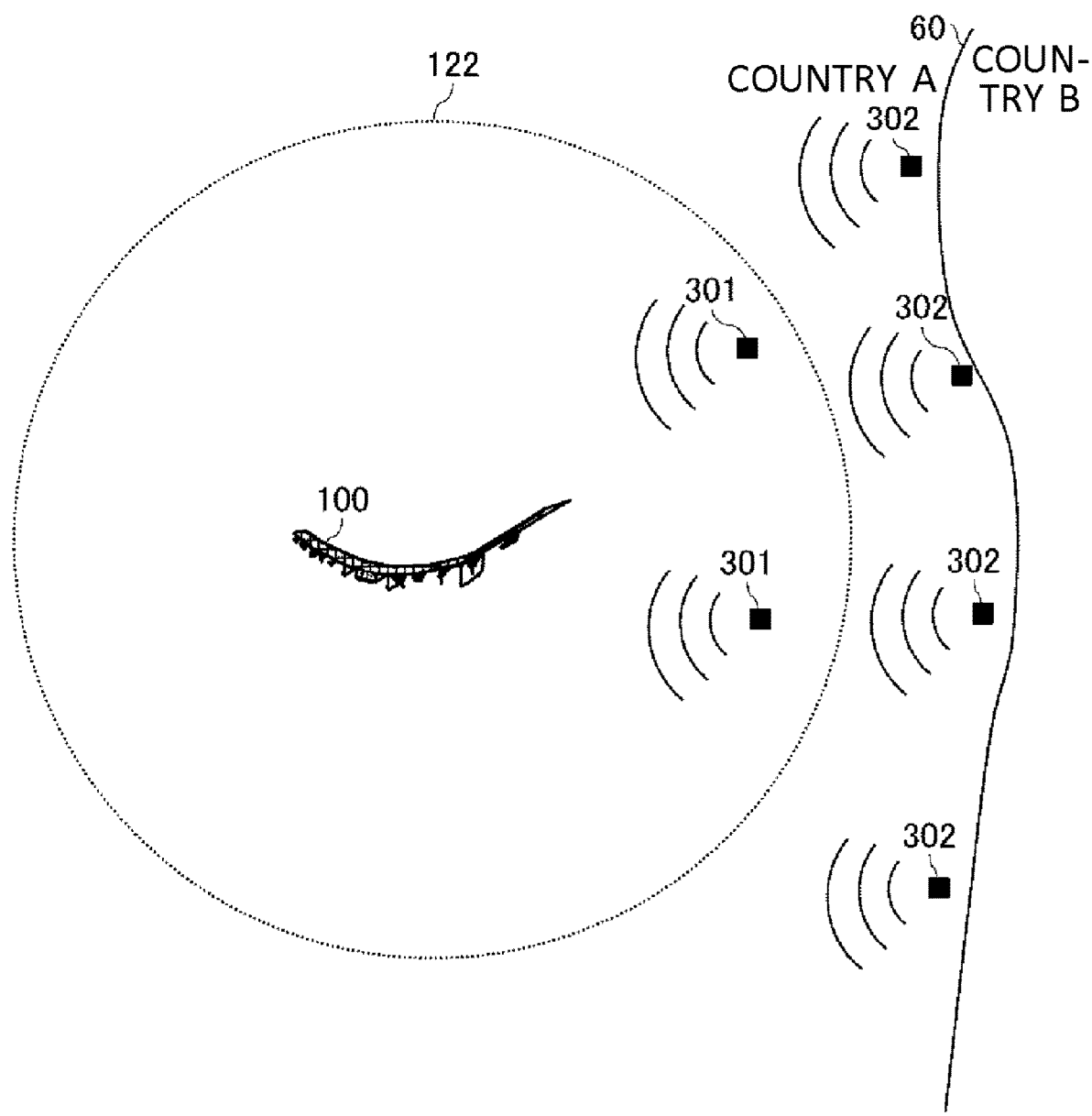
FIG. 14 is an illustration for describing another example of processing performed by a flying object 100 and an information-providing device 300.

FIG. 14 is an illustration for describing another example of processing performed by a flying object 100 and an information-providing device 300. FIG. 14 illustrates a case where country A is a service target country of a wireless communication service provided by a flying object 100 and country B being a neighboring country of country A is a non-service target country of the wireless communication service provided by the flying object 100 as an example.

An information-providing device 301 and an information-providing device 302 are installed in country A being the target area of the wireless communication service provided by the flying object 100. For example, the information-providing device 302 is installed in the vicinity of a country border 60. For example, the information-providing device 301 is installed at a location farther from the country border 60 than the information-providing device 302. For example, the information-providing device 301 is installed at a location farther from the country border 60 than the information-providing device 302 by about 1 to 5 km.

When receiving a beam from the flying object 100, the information-providing device 301 may radiate a radio wave including a response signal to the received beam. For example, when the frequency of the beam received from the flying object 100 is a predetermined frequency band, the information-providing device 301 radiates the radio wave including the response signal to the received beam. The information-providing device 301 may radiate a radio wave including a response signal including signal intensity information representing the signal intensity of the beam of the flying object 100. The information-providing device 301 uses a directional antenna to radiate this radio wave, for example.

For example, the information-providing device 301 radiates a radio wave including a periodic signal. The periodic signal includes information representing the operation state of the information-providing device 301, for example. When receiving the radio wave including the periodic signal from the information-providing device 301, the control device 150 may judge the operation state of the information-providing device 301 based on the information representing the operation state of the information-providing device 301 included in the periodic signal.

The information-providing device 301 may communicate with the information-providing device 302 periodically. For example, the information-providing device 301 communicates with the information-providing device 302 twice a day. The information-providing device 301 communicates with the information-providing device 302 by using a radio wave of a frequency band for which a license is unnecessary, for example.

The information-providing device 301 receives information representing the operation state of the information-providing device 302 from the information-providing device 302 periodically, for example. The information-providing device 301 may irradiate the flying object 100 with a radio wave including a periodic signal including information representing the operation state of the information-providing device 302. When receiving the radio wave including the periodic signal from the information-providing device 301, the control device 150 may judge the operation state of the information-providing device 302 based on the information representing the operation state of the information-providing device 302 included in the periodic signal.

When receiving a beam from the flying object 100, the information-providing device 302 may radiate a radio wave including a response signal to the received beam. For example, when the frequency of the beam received from the flying object 100 is a predetermined frequency band, the information-providing device 302 radiates the radio wave including the response signal to the received beam. The information-providing device 302 radiates a radio wave including a response signal including signal intensity information representing the signal intensity of the beam of the flying object 100. The information-providing device 302 uses a directional antenna to radiate this radio wave, for example.

When receiving a radio wave including a response signal from the information-providing device 301, a control device 150 judges that a wireless communication area 122 includes the installation location of the information-providing device 301. When receiving a radio wave including a response signal from the information-providing device 302, a control device 150 judges that a wireless communication area 122 includes the installation location of the information-providing device 302.

When receiving a radio wave including a response signal from the information-providing device 301 and not receiving a radio wave including a response signal from the information-providing device 302, the control device 150 judges that the wireless communication area 122 includes the installation location of the information-providing device 301 and does not include the installation location of the information-providing device 302. When receiving radio waves including response signals from the information-providing device 301 and the information-providing device 302, the control device 150 judges that the wireless communication area 122 includes the installation location of the information-providing device 301 and the installation location of the information-providing device 302.

When receiving a radio wave including a response signal from the information-providing device 302, the control device 150 may judge whether the signal intensity represented by the signal intensity information of the information-providing device 302 included in this response signal is higher than a predetermined signal intensity threshold. When judging that the signal intensity of the information-providing device 302 is higher than the signal intensity threshold, the control device 150 judges that the non-target area 50 exists in the wireless communication area 122.

In response to judging that the non-target area 50 exists in the wireless communication area 122, the control device 150 controls the flying object 100 such that the non-target area 50 is not irradiated with the beam of the flying object 100. For example, the control device 150 controls a tilt of an antenna 112 based on the location information of the flying object 100, the installation location information of the information-providing device 302, and the response signal including the signal intensity information of the information-providing device 302. The control device 150 may control the output intensity of the antenna 112 based on the response signal including the signal intensity information of the information-providing device 302.

When receiving a radio wave including a response signal from the information-providing device 301, the control device 150 may judge whether the signal intensity represented by the signal intensity information of the information-providing device 301 included in this response signal is higher than a predetermined signal intensity threshold. When judging that the signal intensity of the information-providing device 301 is higher than the signal intensity threshold, the control device 150 judges that the non-target area 50 exists in the wireless communication area 122.

The signal intensity threshold may be set in accordance with the place where an information-providing device 300 is installed. For example, the signal intensity threshold used for the judgement of the signal intensity represented by the signal intensity information of the information-providing device 302 may be lower than the signal intensity threshold used for the judgement of the signal intensity represented by the signal intensity information of the information-providing device 301.

In FIG. 14, the information-providing device 302 may be installed in the territory of country B being the non-target area 50 when country B permits the information-providing device 302 to be installed in the territory of country B. In this case, the control device 150 may judge that the non-target area 50 exists in the wireless communication area 122 when receiving a radio wave including a response signal from the information-providing device 302.

Figure 15:
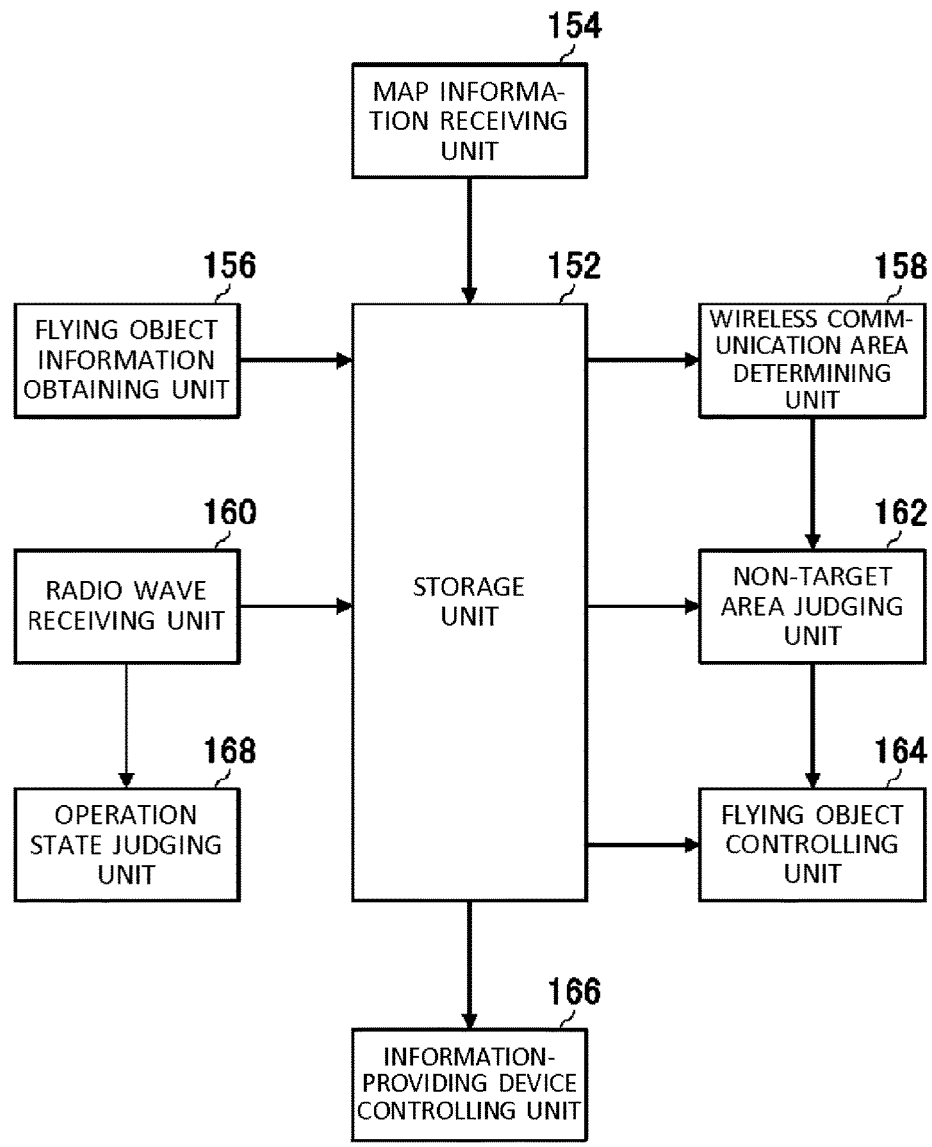
FIG. 15 schematically shows an example of a functional configuration of a control device 150.

FIG. 15 schematically shows an example of a functional configuration of a control device 150. The control device 150 includes, a storage unit 152, a map information receiving unit 154, a flying object information obtaining unit 156, a wireless communication area determining unit 158, a radio wave receiving unit 160, a non-target area judging unit 162, a flying object controlling unit 164, an information-providing device controlling unit 166, and an operation state judging unit 168. Note that the control device 150 does not necessarily include all of these components.

The storage unit 152 stores various types of information.

For example, the storage unit 152 stores identification information for identifying an information-providing device 300 and installation location information representing the installation location of the information-providing device 300 in association with one another. The storage unit 152 may store information representing the number of user terminals 400 in a wireless communication area 122.

The map information receiving unit 154 receives map information from a map information managing server 200 via a network 20. The map information receiving unit 154 stores the received map information in the storage unit 152.

The flying object information obtaining unit 156 obtains information related to a flying object 100. The flying object information obtaining unit 156 obtains the location information of the flying object 100, for example. The flying object information obtaining unit 156 obtains the inclination information of the flying object 100, for example. The flying object information obtaining unit 156 obtains the speed information of the flying object 100, for example. The flying object information obtaining unit 156 obtains information related to an antenna 112, for example. The flying object information obtaining unit 156 obtains information related to an antenna 114, for example. The flying object information obtaining unit 156 may obtain information related to an antenna 116. The flying object information obtaining unit 156 stores the obtained information in the storage unit 152.

The wireless communication area determining unit 158 determines an area that is on the ground and covered by the wireless communication area 122 formed by the antenna 112. The wireless communication area determining unit 158 performs determination intermittently, for example. The wireless communication area determining unit 158 performs determination periodically, for example.

The wireless communication area determining unit 158 estimates the area that is on the ground and covered by the wireless communication area 122 formed by the antenna 112 by using various types of information stored in the storage unit 152, for example. For example, the wireless communication area determining unit 158 estimates the area that is on the ground and covered by the wireless communication area 122 based on the location information and inclination information of the flying object 100, the information related to the antenna 112, and the map information received from the map information managing server 200.

The radio wave receiving unit 160 receives a radio wave radiated by the information-providing device 300. The radio wave received from the information-providing device 300 includes a response signal, for example. The radio wave received from the information-providing device 300 may include a periodic signal. The radio wave receiving unit 160 stores the information included in the radio wave received from the information-providing device 300 in the storage unit 152.

The non-target area judging unit 162 judges whether a non-target area 50 of the wireless communication service provided by the flying object 100 exists in the wireless communication area 122 determined by the wireless communication area determining unit 158 based on the radio wave received by the radio wave receiving unit 160. The non-target area judging unit 162 judges whether the non-target area 50 exist in the wireless communication area 122 based on the response signal included in the radio wave received by the radio wave receiving unit 160, for example.

For example, when receiving a radio wave including a response signal from the information-providing device 300, the non-target area judging unit 162 judges that the non-target area 50 exists in the wireless communication area 122. For example, when the response signal include the installation location information, the non-target area judging unit 162 judges whether the non-target area 50 exists based on the installation location information included in the response signal. When the response signal includes the identification information of the information-providing device 300, the non-target area judging unit 162 may judge whether the non-target area 50 exists based on the installation location information stored in the storage unit 152 in association with the identification information included in the response signal. For example, when an information-providing device 300 is installed in a non-service target area, the non-target area judging unit 162 judges that the installation location of the information-providing device 300 represented by the installation location information is the non-target area 50.

For example, the non-target area judging unit 162 judges whether signal intensity represented by signal intensity information included in the response signal is higher than a predetermined signal intensity threshold. When judging that this signal intensity is higher than this signal intensity threshold, the non-target area judging unit 162 may judge that the non-target area 50 exists.

The flying object controlling unit 164 controls the flying object 100. The flying object controlling unit 164 controls the flight of the flying object 100, for example. The flying object controlling unit 164 controls at least one of the latitude, longitude, or altitude of the flying object 100, for example.

The flying object controlling unit 164 controls the inclination of the flying object 100, for example. The flying object controlling unit 164 controls at least one of the roll angle, pitch angle, or yaw angle of the flying object 100, for example.

The flying object controlling unit 164 may control the antenna 112 of the flying object 100. The flying object controlling unit 164 controls the tilt of the antenna 112, for example. The flying object controlling unit 164 may control the output intensity of the beam radiated by the antenna 112.

The flying object controlling unit 164 may control the antenna 114 of the flying object 100. The flying object controlling unit 164 controls the tilt of the antenna 114, for example. The flying object controlling unit 164 may control the output intensity of the beam radiated by the antenna 114. The flying object controlling unit 164 may control the antenna 116 of the flying object 100. The flying object controlling unit 164 controls the tilt of the antenna 116, for example. The flying object controlling unit 164 may control the output intensity of the beam radiated by the antenna 116.

In response to the non-target area judging unit 162 judging that the non-target area 50 exists, the flying object controlling unit 164 controls the flying object 100 such that the non-target area 50 is not irradiated with the beam of the flying object 100, for example. The flying object controlling unit 164 controls the tilt of the antenna 112 of the flying object 100, for example. The flying object controlling unit 164 controls the output intensity of the antenna 112, for example. The flying object controlling unit 164 may control the inclination of the flying object 100.

The information-providing device controlling unit 166 controls the information-providing device 300. The information-providing device controlling unit 166 controls the information-providing device 300 by designating the frequency band of the radio wave to be radiated to the flying object 100 by the information-providing device 300, for example. For the information-providing device 300, the information-providing device controlling unit 166 designates a frequency band not having been received from another information-providing device 300 or the like by the radio wave receiving unit 160 as the frequency band of the radio wave to be radiated to the control device 150 by the information-providing device 300, for example.

The non-target area judging unit 162 judges whether the non-target area 50 exists in response to the radio wave receiving unit 160 receiving a radio wave in a predetermined pattern, for example. For example, the non-target area judging unit 162 judges whether the non-target area 50 exists in response to the frequency of the radio wave received by the radio wave receiving unit 160 being included in the frequency band designated by the information-providing device controlling unit 166. For example, the non-target area judging unit 162 judges whether the non-target area 50 exists in response to the radio wave receiving unit 160 receiving both of the radio waves of two different frequencies. The non-target area judging unit 162 judges whether the non-target area 50 exists in response to the radio wave receiving unit 160 receiving both of the radio waves of two different polarizations.

For example, the non-target area judging unit 162 judges whether the non-target area 50 exists in response to the radio wave receiving unit 160 receiving both of the radio waves of two different frequencies and each of the received radio waves of two different frequencies being in the predetermined pattern. The non-target area judging unit 162 may judge whether the non-target area 50 exists in response to the radio wave receiving unit 160 receiving both of the radio waves of two different polarizations and each of the received radio waves of two different polarizations being in the predetermined pattern.

The operation state judging unit 168 judges the operation state of the information-providing device 300. When the radio wave receiving unit 160 receives a radio wave including a periodic signal from the information-providing device 300, the operation state judging unit 168 judges the operation state of the information-providing device 300 based on the information represented by the operation state of the information-providing device 300 included in the periodic signal, for example.

When judging that the operation state of the information-providing device 300 is an abnormal state, the operation state judging unit 168 may notify a communication terminal owned by an administrator or the like of the information-providing device 300 that the operation state of the information-providing device 300 is an abnormal state. The administrator or the like of the information-providing device 300 may check this notice with the communication terminal to provide maintenance of the information-providing device 300 or the like.

Figure 16:
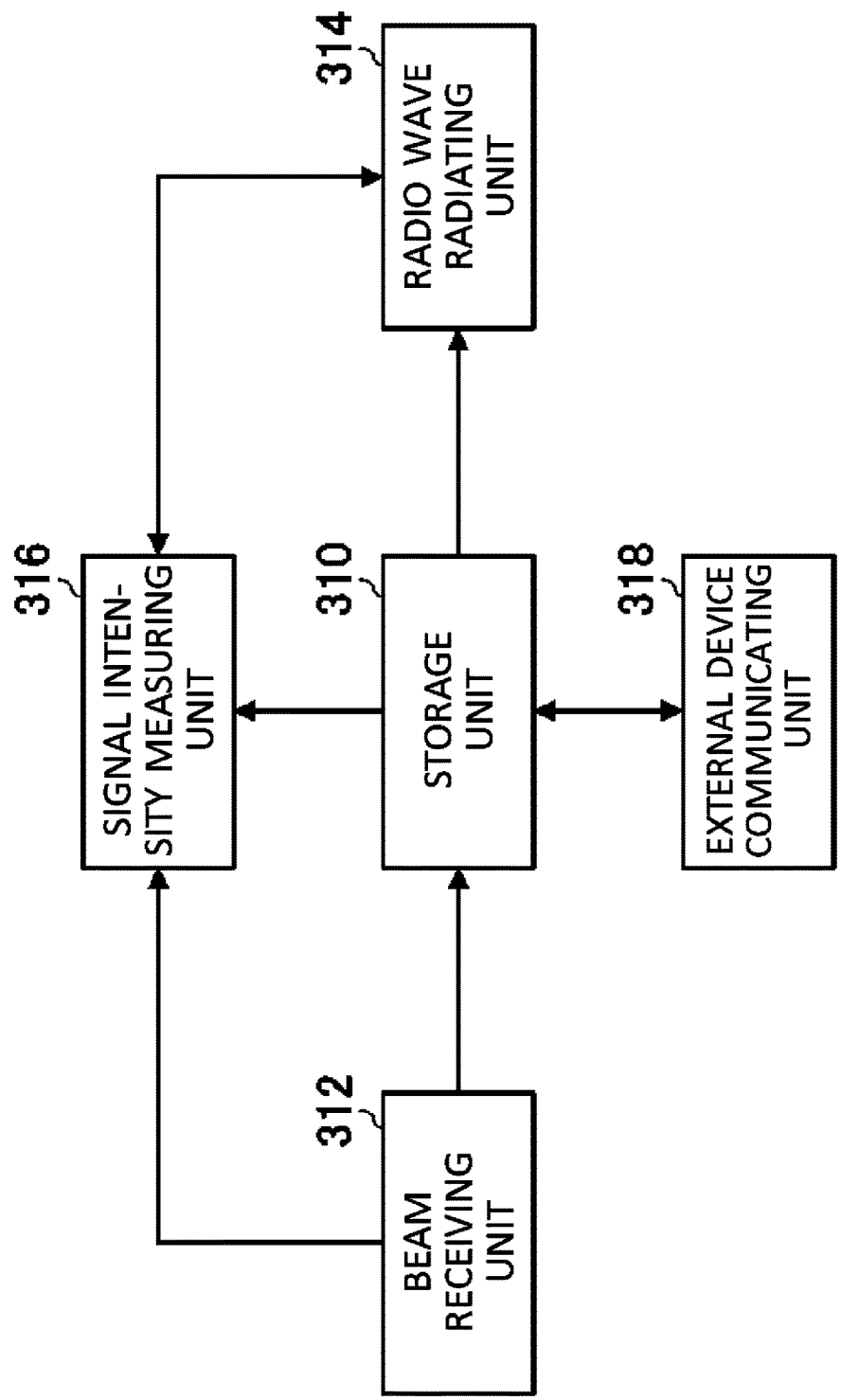
FIG. 16 schematically shows an example of a functional configuration of an information-providing device 300.

FIG. 16 schematically shows an example of a functional configuration of an information-providing device 300. The information-providing device 300 includes a storage unit 310, a beam receiving unit 312, a radio wave radiating unit 314, a signal intensity measuring unit 316, and an external device communicating unit 318. Note that the information-providing device 300 does not necessarily include all of these components.

The storage unit 310 stores various types of information. The storage unit 310 stores installation location information representing the installation location of the information-providing device 300, for example. The storage unit 310 may store the identification information of the information-providing device 300.

The beam receiving unit 312 receives a beam from a flying object 100. The beam receiving unit 312 receives a beam of an SL frequency band, for example. The beam receiving unit 312 stores the information included in the beam received from the flying object 100 in the storage unit 310.

The radio wave radiating unit 314 radiates a radio wave. The radio wave radiating unit 314 radiates a radio wave including a response signal to the beam that is of the flying object 100 and received by the beam receiving unit 312, for example. The radio wave radiating unit 314 may radiate a radio wave including a periodic signal.

For example, when the frequency of the beam that is of the flying object 100 and received by the beam receiving unit 312 is a predetermined frequency band, the radio wave radiating unit 314 radiates a radio wave including the response signal to this beam. In this case, the radio wave radiating unit 314 may change the mode of the antenna to radiate this radio wave from a sleep mode to an operation mode.

The radio wave radiating unit 314 radiates a radio wave according to a predetermined pattern by radiating a radio wave intermittently, for example. The radio wave radiating unit 314 radiates a radio wave of a frequency included in a frequency band designated by the flying object 100. For example, the radio wave radiating unit 314 radiates radio waves of two different frequencies. The radio wave radiating unit 314 radiates radio waves of two different polarizations, for example.

The radio wave radiating unit 314 radiates the radio waves of two different frequencies according to the predetermined pattern respectively, by radiating each of the radio waves of two different frequencies intermittently, for example. The radio wave radiating unit 314 radiates the radio waves of two different polarizations according to the predetermined pattern respectively, by radiating each of the radio waves of two different polarizations intermittently.

The radio wave radiating unit 314 radiates a radio wave of an LPWA frequency band, for example. The radio wave radiating unit 314 may radiate a radio wave of an SL frequency band.

The radio wave radiating unit 314 uses a directional antenna to radiate a radio wave, for example. The radio wave radiating unit 314 may use an omnidirectional antenna to radiate a radio wave.

The signal intensity measuring unit 316 measures signal intensity of a beam that is of the flying object 100 and received by the beam receiving unit 312. The signal intensity measuring unit 316 measures the signal intensity of this beam when the frequency of the beam that is of the flying object 100 and received by the beam receiving unit 312 is a predetermined frequency band, for example. In this case, the radio wave radiating unit 314 radiates a radio wave including a response signal including the signal intensity information representing the signal intensity measured by the signal intensity measuring unit 316.

The external device communicating unit 318 communicates with an external device. The external device communicating unit 318 communicates with another information-providing device 300, for example.

The external device communicating unit 318 transmits information representing the operation state of the information-providing device 300 to the another information-providing device 300, for example. The external device communicating unit 318 may receive information representing the operation state of the another information-providing device 300 from the another information-providing device 300. The external device communicating unit 318 stores the information received from the another information-providing device 300 in the information-providing device 302.

Figure 17:
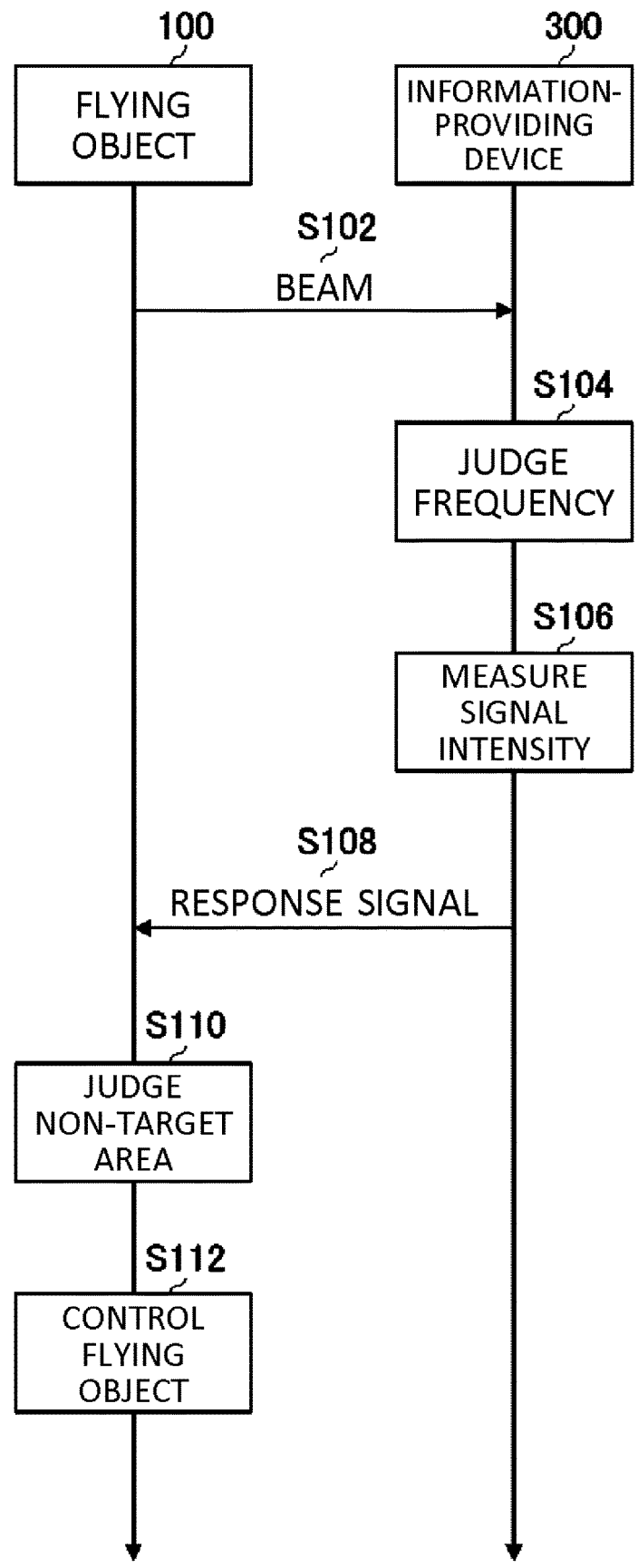
FIG. 17 is an illustration for describing an example of a processing flow executed by a flying object 100 and an information-providing device 300.

FIG. 17 is an illustration for describing an example of a processing flow executed by a flying object 100 and an information-providing device 300. FIG. 17 illustrates a state of the flying object 100 having formed a wireless communication area 122 as a starting state.

At step (the step may be abbreviated as S) 102, a beam receiving unit 312 receives a beam of the flying object 100. At S104, a radio wave radiating unit 314 judges whether the frequency of the beam of the flying object 100 received by the beam receiving unit 312 is a predetermined frequency band. Herein, the description continues assuming that the radio wave radiating unit 314 judges that the frequency of the beam of the flying object 100 received by the beam receiving unit 312 is the predetermined frequency band.

At S106, in response to the radio wave radiating unit 314 judging that the frequency of the beam of the flying object 100 received by the beam receiving unit 312 is the predetermined frequency band, a signal intensity measuring unit 316 measures the signal intensity of this beam. At S108, the radio wave radiating unit 314 irradiates the flying object 100 with a radio wave including a response signal including the signal intensity information representing the signal intensity measured by the signal intensity measuring unit 316.

At S110, a non-target area judging unit 162 judges whether the signal intensity represented by the signal intensity information included in the response signal is higher than a predetermined signal intensity threshold. Herein, the description continues assuming that that the non-target area judging unit 162 judges that the signal intensity is higher than the predetermined signal intensity threshold. In response to judging that the signal intensity is higher than the predetermined signal intensity threshold, the non-target area judging unit 162 judges that a non-target area 50 exists.

At S112, in response to the non-target area judging unit 162 judging that the non-target area 50 exists, a flying object controlling unit 164 controls the flying object 100. The flying object controlling unit 164 controls the flying object 100 such that the non-target area 50 is not irradiated with the beam of the flying object 100, for example.

Figure 18:
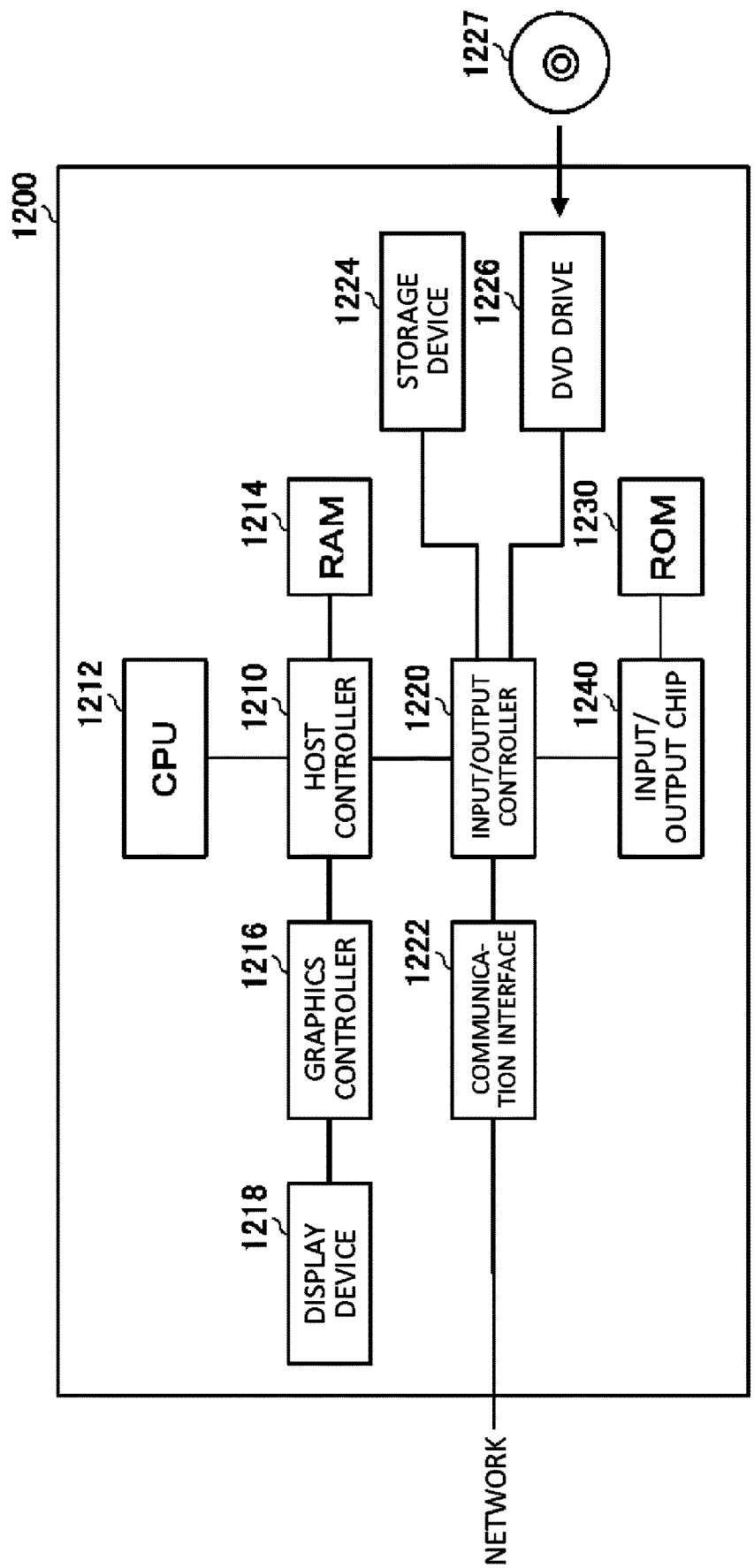
FIG. 18 schematically shows an example of a hardware configuration of a computer 1200 that functions as the information-providing device 300.

FIG. 18 schematically shows an example of a hardware configuration of a computer 1200 that functions as the information-providing device 300. Programs installed in the computer 1200 can cause the computer 1200 to function as one or more "units" of the device according to the above described embodiment or can cause the computer 1200 to execute operations associated with the devices according to the above described embodiment or the one or more "units", and/or can cause the computer 1200 to execute a process according to the above described embodiment or steps of the process. Such a program may be executed by a CPU 1212 to cause the computer 1200 to perform specific operations associated with some or all of the blocks in the flowcharts and block diagrams described in the specification.

The computer 1200 according to the present embodiment includes a CPU 1212, a RAM 1214, and a graphics controller 1216, which are connected to each other via a host controller 1210. The computer 1200 also includes input/output units such as a communication interface 1222, a storage device 1224, a DVD drive 1226 and an IC card drive, which are connected to the host controller 1210 via an input/output controller 1220. The DVD drive 1226 may be a DVD-ROM drive, a DVD-RAM drive, or the like. The storage device 1224 may be a hard disk drive, a solid-state drive, or the like. The computer 1200 also includes a legacy input/output unit such as a ROM 1230, which are connected to the input/output controller 1220 via an input/output chip 1240.

The CPU 1212 operates according to the programs stored in the ROM 1230 and the RAM 1214, thereby controlling each unit. The graphics controller 1216 obtains image data which is generated, by the CPU 1212, in a frame buffer or the like provided in the RAM 1214 or in itself so as to cause the image data to be displayed on a display device 1218.

The communication interface 1222 communicates with other electronic devices via a network. The storage device 1224 stores a program and data used by the CPU 1212 in the computer 1200. The DVD drive 1226 reads the programs or the data from the DVD-ROM 1227 or the like, and provides the storage device 1224 with the programs or the data. The IC card drive reads the program and data from an IC card, and/or writes the program and data to the IC card.

The ROM 1230 stores therein a boot program or the like executed by the computer 1200 at the time of activation, and/or a program depending on the hardware of the computer 1200. The input/output chip 1240 may also connect various input/output units via a USB port, a parallel port, a serial port, a keyboard port, a mouse port, or the like to the input/output controller 1220.

A program is provided by a computer readable storage medium such as a DVD-ROM 1227 or an IC card. The program is read from the computer readable storage medium, installed into the storage device 1224, RAM 1214, or ROM 1230, which are also examples of a computer readable storage medium, and executed by the CPU 1212. Information processing written in these programs is read by the computer 1200, and provides cooperation between the programs and the various types of hardware resources described above. A device or method may be constituted by realizing the operation or processing of information in accordance with the use of the computer 1200.

For example, in a case where a communication is performed between the computer 1200 and an external device, the CPU 1212 may execute a communication program loaded in the RAM 1214 and instruct the communication interface 1222 to perform communication processing based on a process written in the communication program. The communication interface 1222, under control of the CPU 1212, reads transmission data stored on a transmission buffer region provided in a recording medium such as the RAM 1214, the storage device 1224, the DVD-ROM 1227, or the IC card, and transmits the read transmission data to a network or writes reception data received from a network to a reception buffer region or the like provided on the recording medium.

In addition, the CPU 1212 may cause all or a necessary portion of a file or a database, which has been stored in an external recording medium such as the storage device 1224, the DVD drive 1226 (DVD-ROM 1227), the IC card and the like, to be read into the RAM 1214, thereby executing various types of processing on the data on the RAM 1214. Then, the CPU 1212 may write the processed data back in the external recording medium.

Various types of information, such as various types of programs, data, tables, and databases, may be stored in the recording medium to undergo information processing. The CPU 1212 may execute, on the data read from the RAM 1214, various types of processing including various types of operations, information processing, conditional judgement, conditional branching, unconditional branching, information retrieval/replacement, or the like described throughout the present disclosure and specified by instruction sequences of the programs, to write the results back to the RAM 1214. In addition, the CPU 1212 may retrieve information in a file, a database, or the like in the recording medium. For example, when a plurality of entries, each having an attribute value of a first attribute associated with an attribute value of a second attribute, are stored in the recording medium, the CPU 1212 may search for an entry whose attribute value of the first attribute matches a designated condition, from among the plurality of entries, and read the attribute value of the second attribute stored in the entry, thereby obtaining the attribute value of the second attribute associated with the first attribute satisfying a predetermined condition.

The programs or software module described above may be stored on the computer 1200 or in a computer readable storage medium near the computer 1200. In addition, a recording medium such as a hard disk or a RAM provided in a server system connected to a dedicated communication network or the Internet can be used as the computer readable storage medium, thereby providing the program to the computer 1200 via the network.

Blocks in flowcharts and block diagrams in the present embodiments may represent steps of processes in which operations are performed or "units" of devices responsible for performing operations. A specific step and "unit" may be implemented by dedicated circuitry, programmable circuitry supplied along with a computer readable instruction stored on a computer readable storage medium, and/or a processor supplied along with the computer readable instruction stored on the computer readable storage medium. The dedicated circuitry may include a digital and/or analog hardware circuit, or may include an integrated circuit (IC) and/or a discrete circuit. The programmable circuitry may include, for example, a reconfigurable hardware circuit including logical AND, logical OR, logical XOR, logical NAND, logical NOR, and other logical operations, and a flip-flop, a register, and a memory element, such as a field-programmable gate array (FPGA) and a programmable logic array (PLA).

The computer readable storage medium may include any tangible device capable of storing an instruction performed by an appropriate device, so that the computer readable storage medium having the instruction stored thereon constitutes a product including an instruction that may be performed in order to provide means for performing an operation specified by a flowchart or a block diagram. Examples of the computer readable storage medium may include an electronic storage medium, a magnetic storage medium, an optical storage medium, an electromagnetic storage medium, a semiconductor storage medium, and the like. More specific examples of the computer readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disc (DVD), a Blu-ray (registered trademark) disc, a memory stick, an integrated circuit card, or the like.

The computer readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

The computer readable instruction may be provided to a general purpose computer, a special purpose computer, or a processor or programmable circuitry of another programmable data processing device locally or via a local area network (LAN), a wide area network (WAN) such as the Internet or the like in order that the general purpose computer, the special purpose computer, or the processor or the programmable circuitry of the other programmable data processing device performs the computer readable instruction to provide means for performing operations specified by the flowchart or the block diagram. An example of the processor includes a computer processor, processing unit, microprocessor, digital signal processor, controller, microcontroller, or the like.

While the present invention has been described by way of the embodiments, the technical scope of the present invention is not limited to the above described embodiments. It is apparent to persons skilled in the art that various alterations or improvements can be added to the above-described embodiments. It is also apparent from the scope of the claims that the embodiments added with such alterations or improvements can be included in the technical scope of the present invention.

The operations, procedures, steps, and stages of each process performed by an device, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system, 20: network, 40: gateway, 50: non-target area, 60: country border, 100: flying object, 101: main wing portion, 102: body portion, 104: propeller, 110: solar panel, 112: antenna, 114: antenna, 116: antenna, 122: wireless communication area, 150: control device, 152: storage unit, 154: map information receiving unit, 156: flying object information obtaining unit, 158: wireless communication area determining unit, 160: radio wave receiving unit, 162: non-target area judging unit, 164: flying object controlling unit, 166: information-providing device controlling unit, 168: operation state judging unit, 200: map information managing server, 300: information-providing device, 301: information-providing device, 302: information-providing device, 310: storage unit, 312: beam receiving unit, 314: radio wave radiating unit, 316: signal intensity measuring unit, 318: external device communicating unit, 320: antenna, 330: antenna, 340: antenna, 345: reflector, 350: antenna, 360: antenna, 370: antenna, 375: antenna, 380: antenna, 385: antenna, 390: solar panel, 400: user terminal, 450: user, 1200: computer, 1210: host controller, 1212: CPU, 1214: RAM, 1216: graphics controller, 1218: display device, 1220: input/output controller, 1222: communication interface, 1224: storage device, 1226: DVD drive, 1227: DVD-ROM, 1230: ROM, and 1240: input/output chip.

What is claimed is:

1. A system, comprising:
an information-providing device; and
a flying object which functions as a stratosphere platform and is equipped with a control device which radiates a beam to form a wireless communication area to provide wireless communication service to a user terminal in the wireless communication area, wherein
the information-providing device irradiates the flying object with a radio wave including a response signal to the beam when a frequency of the beam received from the flying object is a predetermined frequency band, and
the control device comprises:
a radio wave receiving unit which receives the radio wave radiated by the information-providing device;
a non-target area judging unit which judges whether a non-target area of the wireless communication service exists in the wireless communication area based on the response signal included in the radio wave received by the radio wave receiving unit; and
a flying object controlling unit which controls the flying object not to irradiate the non-target area with the beam in response to the non-target area judging unit judging that the non-target area exists.

2. The system according to claim 1, wherein
the information-providing device irradiates the flying object with the radio wave including the response signal including installation location information representing an installation location of the information-providing device, and
the non-target area judging unit judges whether the non-target area exists based on the installation location information included in the response signal.

3. The system according to claim 2, wherein
when the frequency of the beam is the predetermined frequency band, the information-providing device measures signal intensity of the beam and irradiates the flying object with the radio wave including the response signal including signal intensity information representing the signal intensity having been measured, and
the non-target area judging unit judges whether the signal intensity represented by the signal intensity information included in the response signal is higher than a predetermined signal intensity threshold, and, when judging that the signal intensity is higher than the signal intensity threshold, judges that the non-target area exists.

4. The system according to claim 2, wherein the information-providing device uses a directional antenna to irradiate the flying object with the radio wave.

5. The system according to claim 2, wherein the information-providing device uses an LPWA (Low Power Wide Area) communication scheme to irradiate the flying object with the radio wave.

6. The system according to claim 2, wherein
the information-providing device irradiates the flying object with the radio wave according to a predetermined pattern by radiating the radio wave intermittently, and
the non-target area judging unit judges whether the non-target area exists in response to the radio wave receiving unit receiving the radio wave in the predetermined pattern.

7. The system according to claim 2, wherein
the information-providing device irradiates the flying object with the radio waves of two different frequencies, and
the non-target area judging unit judges whether the non-target area exists in response to the radio wave receiving unit receiving both of the radio waves of two different frequencies.

8. The system according to claim 2, wherein
the information-providing device irradiates the flying object with the radio waves of two different polarizations, and
the non-target area judging unit judges whether the non-target area exists in response to the radio wave receiving unit receiving both of the radio waves of two different polarizations.

9. The system according to claim 2, wherein the information-providing device comprises a solar panel and a battery which stores electric power generated by the solar panel, does not have a function of receiving electric power from an external power supply, and irradiates the flying object with the radio wave including the response signal by using electric power of the battery.

10. The system according to claim 1, wherein
the information-providing device irradiates the flying object with the radio wave including the response signal including identification information for identifying the information-providing device,
the control device further comprises a storage unit which stores the identification information and installation location information representing an installation location of the information-providing device in association with one another, and
the non-target area judging unit judges whether the non-target area exists based on the installation location information stored in the storage unit in association with the identification information included in the response signal.

11. The system according to claim 1, wherein
when the frequency of the beam is the predetermined frequency band, the information-providing device measures signal intensity of the beam and irradiates the flying object with the radio wave including the response signal including signal intensity information representing the signal intensity having been measured, and
the non-target area judging unit judges whether the signal intensity represented by the signal intensity information included in the response signal is higher than a predetermined signal intensity threshold, and, when judging that the signal intensity is higher than the signal intensity threshold, judges that the non-target area exists.

12. The system according to claim 1, wherein the information-providing device uses a directional antenna to irradiate the flying object with the radio wave.

13. The system according to claim 1, wherein the information-providing device uses an LPWA (Low Power Wide Area) communication scheme to irradiate the flying object with the radio wave.

14. The system according to claim 1, wherein
the information-providing device irradiates the flying object with the radio wave according to a predetermined pattern by radiating the radio wave intermittently, and the non-target area judging unit judges whether the non-target area exists in response to the radio wave receiving unit receiving the radio wave in the predetermined pattern.

15. The system according to claim 1, wherein
the information-providing device irradiates the flying object with the radio waves of two different frequencies, and
the non-target area judging unit judges whether the non-target area exists in response to the radio wave receiving unit receiving both of the radio waves of two different frequencies.

16. The system according to claim 1, wherein
the information-providing device irradiates the flying object with the radio waves of two different polarizations, and
the non-target area judging unit judges whether the non-target area exists in response to the radio wave receiving unit receiving both of the radio waves of two different polarizations.

17. The system according to claim 1, wherein the information-providing device comprises a solar panel and a battery which stores electric power generated by the solar panel, does not have a function of receiving electric power from an external power supply, and irradiates the flying object with the radio wave including the response signal by using electric power of the battery.

18. The system according to claim 1, wherein
the non-target area is at least one of an area including a territory of a non-service target country or an area where wireless communication areas respectively formed by two flying objects overlap.

19. The system according to claim 1, wherein
the information-providing device does not irradiate the flying object with the radio wave including the response signal to the beam when the frequency of the beam received from the flying object is not the predetermined frequency band.

* * * * *